United States Patent
Mukherjee et al.

(10) Patent No.: US 11,039,383 B2
(45) Date of Patent: Jun. 15, 2021

(54) FACILITATING RESERVATION AND USE OF REMOTE RADIO UNITS (RRUS) OF RADIO PROVIDERS FOR MOBILE SERVICE PROVIDERS IN VIRTUALIZED RADIO ACCESS NETWORK (VRAN) ENVIRONMENTS

(71) Applicant: Cisco Technology, Inc., San Jose, CA (US)

(72) Inventors: Arghya Mukherjee, Acton, MA (US); Om Prakash Suthar, Bolingbrook, IL (US); Yoshitaka Nagami, Tokyo (JP); Fei Gao, Kanagawa-Ken (JP); Santanu Dasgupta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/004,794

(22) Filed: Aug. 27, 2020

(65) Prior Publication Data
US 2021/0045046 A1 Feb. 11, 2021

Related U.S. Application Data

(63) Continuation of application No. 16/531,804, filed on Aug. 5, 2019, now Pat. No. 10,791,507.

(51) Int. Cl.
*H04W 36/08* (2009.01)
*H04B 7/26* (2006.01)
(Continued)

(52) U.S. Cl.
CPC ........... *H04W 48/16* (2013.01); *H04W 4/029* (2018.02)

(58) Field of Classification Search
None
See application file for complete search history.

(56) References Cited

U.S. PATENT DOCUMENTS

| 9,998,310 B2 | 6/2018 | Barbieri et al. |
| 10,257,105 B2 | 4/2019 | Majmundar et al. |
(Continued)

FOREIGN PATENT DOCUMENTS

| WO | 2001052475 A2 | 7/2001 |
| WO | 2010108540 A1 | 9/2010 |
(Continued)

OTHER PUBLICATIONS

3GPP, "3rd Generation Partnership Project; Technical Specification Group Radio Access Network; NF-RAN; Architecture Description (Release 15)," 3GPP TS 38.401 V15.6.0 (Jul. 2019), Technical Specification, Jul. 2019, 46 pages.

(Continued)

*Primary Examiner* — Gary Lafontant
(74) *Attorney, Agent, or Firm* — Edell, Shapiro & Finnan, LLC

(57) ABSTRACT

A broker network may be configured to serve as an intermediary between one or more radio providers and one or more mobile service providers for reservation of remote radio units (RRUs) for use in a virtualized radio access network (vRAN) environment. The broker network may receive, from a mobile network, a message indicating a request for identification of RRUs of at least one radio provider. The broker network may send, to the mobile network, one or more messages including a plurality of identifiers which identify a plurality of RRUs, and a geographic location and capabilities associated with each RRU. After receiving a selection of an RRU, the broker network may send to the RRU a message which triggers communication with a virtualized Distributed Unit (vDU) for a remote configuration of parameters in the selected RRU, so that it may be used to facilitate communication with UEs in the mobile network.

20 Claims, 21 Drawing Sheets

(51) Int. Cl.
    *H04W 48/16*     (2009.01)
    *H04W 4/029*     (2018.01)

(56) References Cited

U.S. PATENT DOCUMENTS

| | | | |
|---|---|---|---|
| 2011/0165903 A1 | 7/2011 | Selen et al. | |
| 2012/0026961 A1 | 2/2012 | Pittmann et al. | |
| 2013/0303114 A1 | 11/2013 | Ahmad et al. | |
| 2014/0162667 A1 | 6/2014 | Mueck | |
| 2014/0355567 A1 | 12/2014 | Irmer et al. | |
| 2015/0003413 A1 | 1/2015 | McKibben et al. | |
| 2015/0006689 A1 | 1/2015 | Szilagyi et al. | |
| 2015/0271681 A1 | 9/2015 | Perez et al. | |
| 2016/0165066 A1 | 1/2016 | Yang et al. | |
| 2016/0359682 A1 | 12/2016 | Senarath et al. | |
| 2017/0150435 A1 | 5/2017 | Tagg et al. | |
| 2017/0223701 A1 | 8/2017 | Bendle et al. | |
| 2018/0152261 A1 | 5/2018 | Iovanna et al. | |
| 2018/0184331 A1 | 6/2018 | Samdanis et al. | |
| 2018/0220358 A1 | 8/2018 | Reith | |
| 2018/0287696 A1* | 10/2018 | Barbieri | H04W 36/22 |
| 2018/0368109 A1 | 12/2018 | Kim | |
| 2019/0182211 A1 | 6/2019 | Yang et al. | |
| 2019/0254047 A1* | 8/2019 | Ahmed | H04L 47/30 |
| 2019/0320486 A1* | 10/2019 | Khan | G06F 9/45558 |
| 2019/0394658 A1 | 12/2019 | Baillargeon | |

FOREIGN PATENT DOCUMENTS

| | | |
|---|---|---|
| WO | 2013170045 A2 | 11/2013 |
| WO | 2015070909 A1 | 5/2015 |
| WO | 2016198104 A1 | 12/2016 |
| WO | 2017025152 A1 | 2/2017 |

OTHER PUBLICATIONS

3GPP, "3rd Generation Partnership Project; Technical Specification Group Services and System Aspects; Study on Radio Access Network (RAN) sharing enhancements (Release 13)," 3GPP TR 22.852 V13.1.0 (Sep. 2014), Technical Report, Sep. 2014, 34 pages.
ETSI, "Digital cellular telecommunications system (Phase 2+); Universal Mobile Telecommunications System (UMTS); LTE; Telecommunication management; Data formats for multi-vendor plug and play eNode B connection to the network (3GPP TS 32.509 version 12.0.0 Release 12)," ETSI TS 132 509 V12.0.0 (Oct. 2014), Technical Specification, Oct. 2014, 15 pages.
NGMN Alliance, "NGMN Overview on 5G RAN Functional Decomposition," Version 1.0, Feb. 2018, 47 pages.
ITU, "Transport network support of IMT-2020/5G," ITU-T, Technical Report, GSTR-TN5G, Feb. 2018, 21 pages.
ETSI, "Digital cellular telecommunications system (Phase 2+); Universal Mobile Telecommunications System (UMTS); LTE; Telecommunication management; Procedure flows for multi-vendor plug-and-play eNode B connection to the network (3GPP TS 32.508 version 12.0.0 Release 12)," ETSI TS 132 508 V12.0.0 (Oct. 2014), Technical Specification, Oct. 2014, 22 pages.
3GPP, "3rd Generation Partnership Project; Technical Specification Group Radio Access Network; NG-RAN; Architecture description (Release 15)," 3GPP TS 38.401 V15.5.0 (Mar. 2019), Technical Specification, Mar. 2019, 39 pages.
Viavi Solutions, Inc., "Cloud-RAN Deployment with CPRI Fronthaul Technology", cloudRAN-wp-tfs-nse-ae, 2015, 8 pages.
Khatini, Sina et al., "Modelling and implementation of virtual radio resources management for 5G Cloud RAN", EURASIP Journal on Wireless Communications and Networking, DOI 10.1186/s13638-017-0908-1, Jul. 19, 2017, 16 pages.
SKMM/MCMMC, "Invitation to Register Interest as Universal Service Provider", Appendix 3 Technical Specifications for Part 2, Malaysian Communications and Multimedia Commission, MCMC/ID/USDD(1)/U1/TC/05/17(06), downloaded May 13, 2020, 12 pages.
ZTE, "5G-oriented Optical Transport Network Solution", downloaded May 13, 2020, 19 pages.
Huawei Technologies Co., Ltd., "5G Network Architecture—A High Level View", Whitepaper 2016, 21 pages.
Lopez, Maribel, "Verizon, Samsung and the Coming 5G War", https://www.forbes.com/sites/forbes-personal-shopper/2020/05/08/the-best-alcohol-delivery-apps-and-services/#1fd26373456f, Apr. 19, 2018, 6 pages.
Khatri, Paresh, "Dimensioning the Anyhaul network for 5G", Impact of 5G on IP transport networks, Nokia 2018, downloaded May 13, 2020, 13 pages.
Mavenir, "Rewriting the Infrastructure Rulebook With OpenRAN", https://mavenir.com/resources/rewriting-the-infrastructure-rulebook-with-openran/?print=trues, downloaded May 15, 2020, 1 page.
Parallel Wireless, Inc., "Tackling Network Densification Challenges for 5G", downloaded May 13, 2020, 10 pages.
Mavenir, "OpenRAN Partner Ecosystem", https://mavenir.com/openran-partner-ecosystem/?print=trues, downloaded May 15, 2020, 3 pages.

* cited by examiner

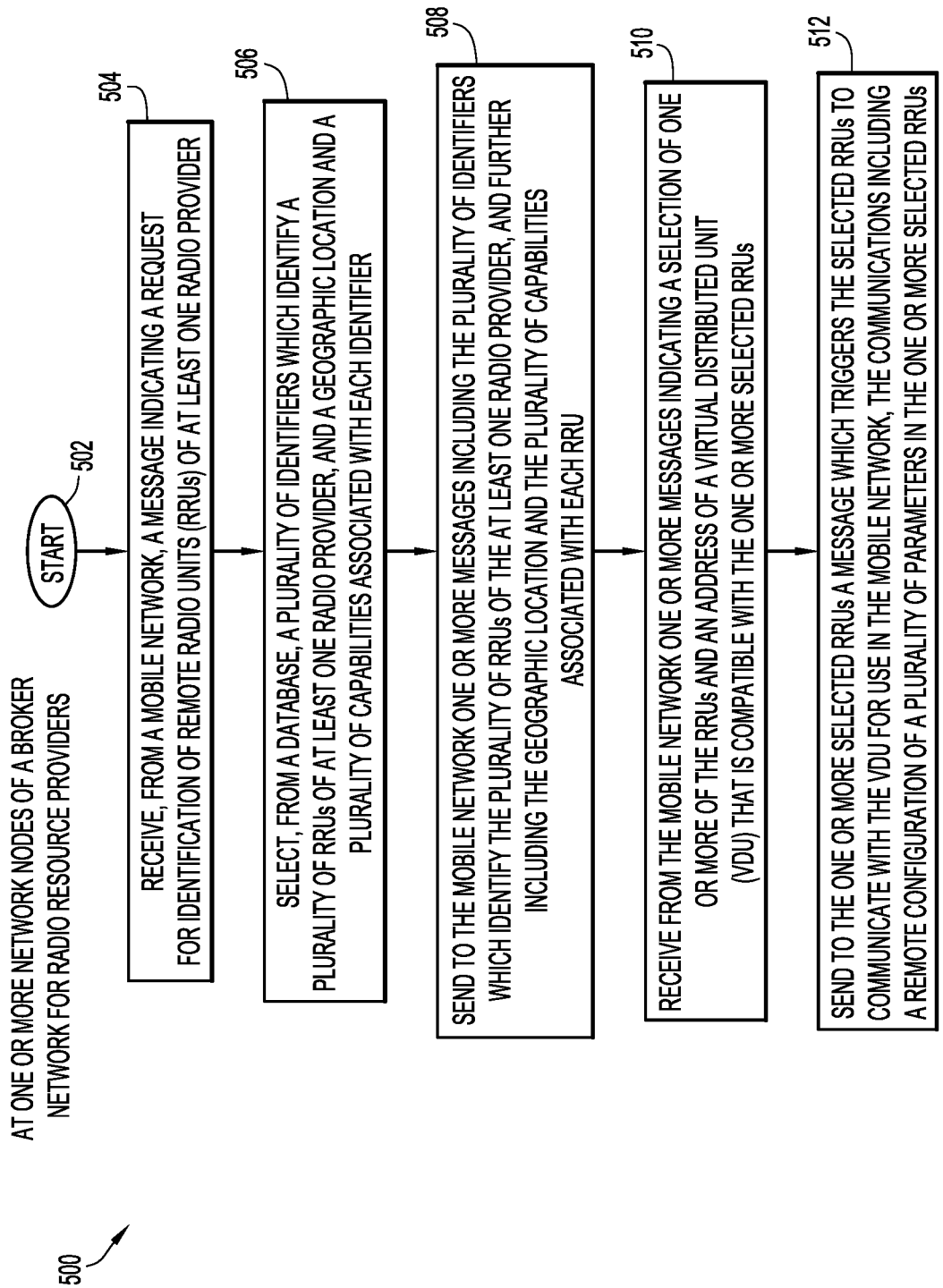

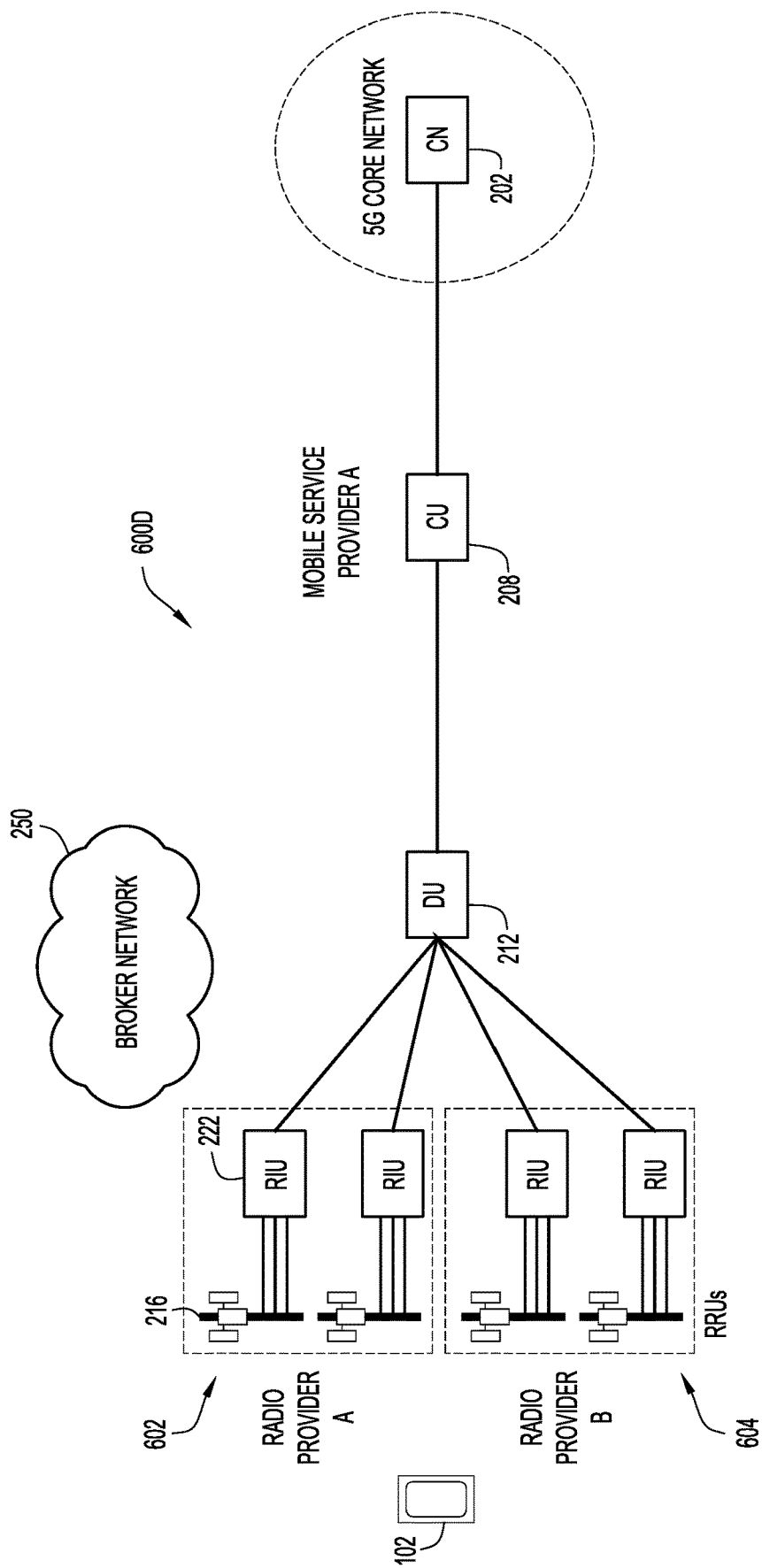

FACILITATING RESERVATION AND USE OF REMOTE RADIO UNITS (RRUS) OF RADIO PROVIDERS FOR MOBILE SERVICE PROVIDERS IN VIRTUALIZED RADIO ACCESS NETWORK (VRAN) ENVIRONMENTS

CROSS-REFERENCE TO RELATED APPLICATIONS

This application is a continuation of U.S. patent application Ser. No. 16/531,804, filed Aug. 5, 2019, the entirety of which is incorporated herein by reference.

TECHNICAL FIELD

The present disclosure relates generally to techniques and mechanisms associated with virtualized radio access networks (vRANs), and more particularly to techniques and mechanisms for facilitating identification and use of remote radio units (RRUs) of radio providers to mobile service providers in vRAN environments.

BACKGROUND

The current model for building a mobile network is outdated. Operators have been constrained by legacy vendor architectures that have remained essentially unchanged since the advent of mobile networks. Although these architectures were useful in prior generations, they are not well suited for today's more dynamic, application-driven environment. Operators need a new model to ensure they remain competitive delivering new services faster, while decreasing both capital and operating expenses.

A new software-defined architecture that includes cloud virtualization and automation will help operators meet these new application and operational demands. Here, operators will reap the benefits of having true multivendor networks that are harmonized with a common feature set across markets. With the onset of this new software-defined architecture, the supply chain for mobile network infrastructure deployment changes at a fundamental level. It will support an unprecedented level of versatility, allowing operators to combine best-in-class functions from multiple vendors. Operators can evolve services as needed to address the demands of a competitive environment.

As the new architectures embrace a software-centric approach, they may promote more automation and service versatility. Many software-defined functions will be provided in virtualized environments at or near the edge of networks, which enables support for a newer type of services defined in edge computing or multi-access edge computing (MEC).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4 and 5 are flowcharts for describing methods for use in facilitating reservation and use of radio resources of radio providers to mobile service providers via a broker network in a vRAN environment according to some implementations of the present disclosure;

FIGS. 6A-6F are illustrative representations of network node arrangements of the NG-RAN architecture of FIG. 3, for use in describing example scenarios of reserving and using radio resources of radio providers to mobile service providers via a broker network in a vRAN environment;

DESCRIPTION OF EXAMPLE EMBODIMENTS

Figure 1A:
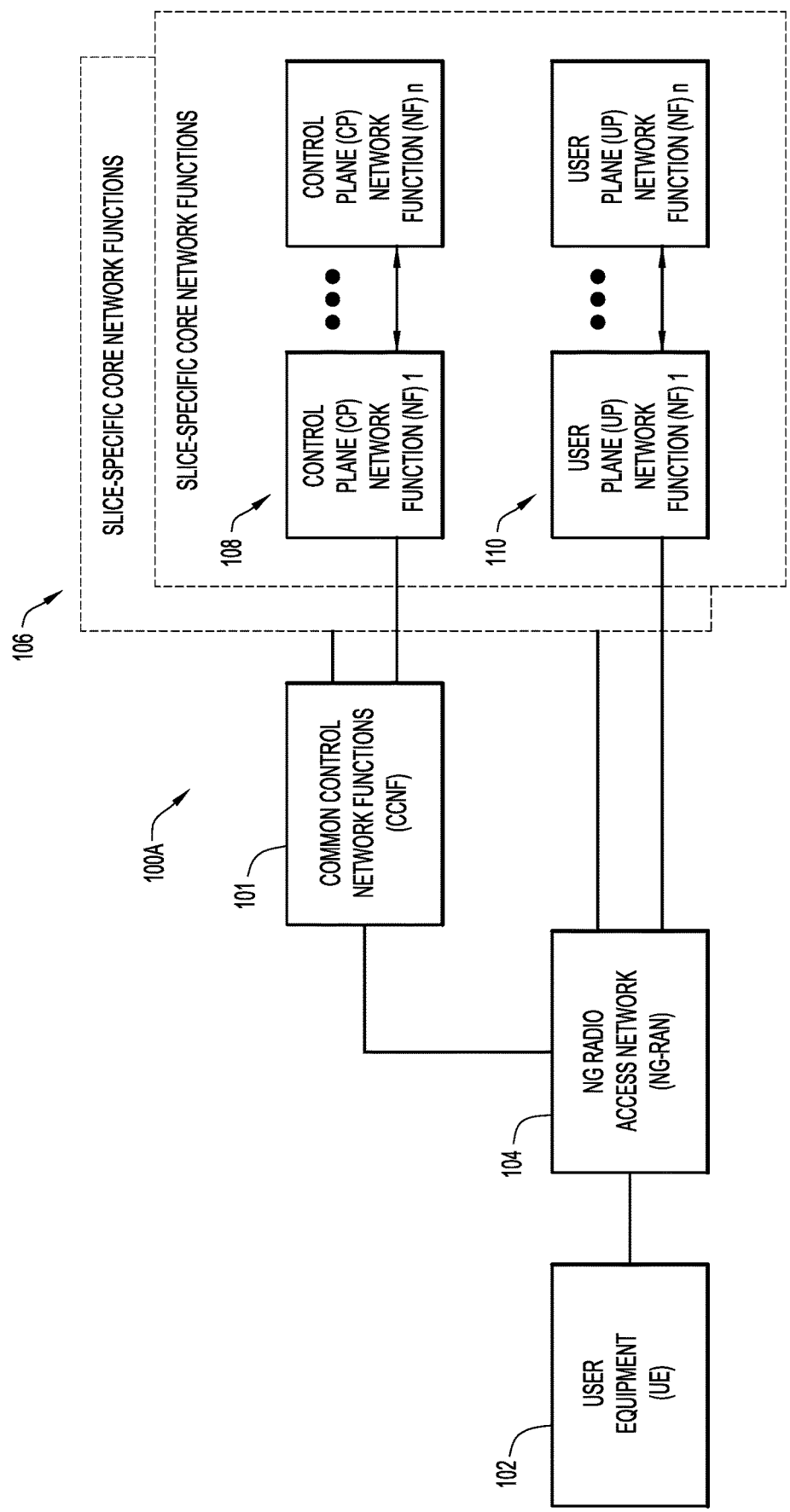
FIG. 1A is an illustrative representation of a general network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for facilitating reservation and use of remote radio units (RRUs) of radio providers for mobile server providers in virtualized radio access network (vRAN) environments are described herein.

In one illustrative example, a broker network may be configured to serve as an intermediary between one or more radio providers and one or more mobile service providers for reservation and use of RRUs in a vRAN environment. The broker network may receive, from a mobile network, a message indicating a request for identification of RRUs of at least one radio provider. The request for identification of RRUs may be a request for identification of RRUs with one or more requirements (e.g. one or more of a location, a radius, radio parameters, or other attributes). The broker network may send, to the mobile network, one or more messages including a plurality of identifiers which identify a plurality of RRUs, and a geographic location and capabilities associated with each RRU. After receiving a selection of an RRU, the broker network may send to the RRU a message which triggers communication with a virtualized distributed unit (vDU) for a remote configuration of parameters in the selected RRU, so that it may be used to facilitate communication with UEs in the mobile network.

In another illustrative example, a mobile network may include one or more network nodes configured to operate with a broker network to reserve RRUs of one or more radio providers for use in a vRAN environment. The mobile network may send, to the broker network, a message indicating a request for identification of RRUs of at least one radio provider. The request for identification of RRUs may be a request for identification of RRUs with one or more requirements (e.g. one or more of a location, a radius, radio parameters, or other attributes). The mobile network may receive, from the broker network, one or more messages which include a plurality of identifiers which identify a plurality of RRUs of the at least one radio provider, where the one or more messages further indicate a geographic location and a plurality of capabilities associated with each RRU. The mobile network may select one of the RRUs based on the geographic location and the plurality of capabilities of the RRU, for use with a vDU that is compatible with the selected RRU. The mobile network may then remotely configure the selected RRU with a plurality of parameters for use in the mobile network.

More detailed and alternative techniques and implementations are provided herein as described below.

EXAMPLE EMBODIMENTS

As described above, the current model for building a mobile network is outdated. Operators have been constrained by legacy vendor architectures that have remained essentially unchanged since the advent of mobile networks. Although these architectures were useful in prior generations, they are not well suited for today's more dynamic, application-driven environment. Operators need a new model to ensure they remain competitive in delivering new services faster, while decreasing both capital and operating expenses.

Consider the traditional, monolithic functional implementation of a base transceiver station (BTS) as an example of why the current mobile supply chain is outdated. With the implementation of the BTS, operators have to choose one vendor per market and harmonize the macro vendor markets to a "lowest common denominator" set of features due to the lack of open standards. The result is a limited set of applications that operators can provide to customers. When proprietary features are implemented, vendor dependencies and "lock-in" can propagate into other domains.

To better explain in relation to the figures, FIG. 1A is an illustrative representation of a general network architecture 100A of a 5G network. Network architecture 100A includes common control network functions (CCNF) 101 and a plurality of slice-specific core network functions 106. With network architecture 100A, the 5G network may be configured to facilitate communications for a user equipment (UE) 102. UE 102 may obtain access to the 5G network via a radio access network (RAN) or a Next Generation (NG) RAN (NG-RAN) 104. UE 102 may be any suitable type of device, such as a cellular telephone, a smart phone, a tablet device, an Internet of Things (IoT) device, a machine-to-machine (M2M) device, and a sensor, to name but a few.

Notably, the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services. Accordingly, CCNF 101 includes a plurality of NFs which commonly support all sessions for UE 102. UE 102 may be connected to and served by a single CCNF 101 at a time, although multiple sessions of UE 102 may be served by different slice-specific core network functions 106. CCNF 101 may include, for example, an access and mobility management function (AMF) and a network slice selection function (NSSF). UE-level mobility management, authentication, and network slice instance selection are examples of functionalities provided by CCNF 101.

On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
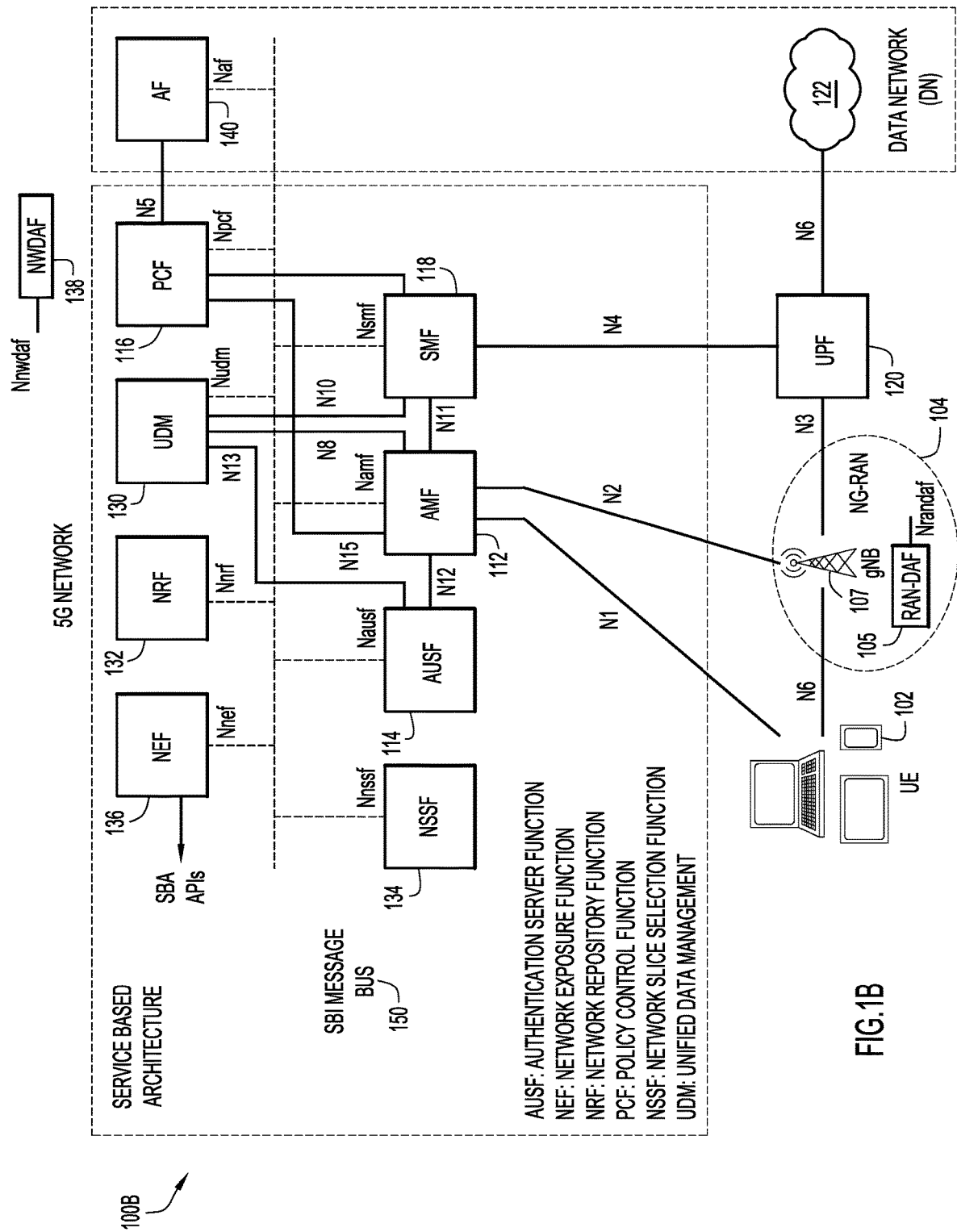
FIG. 1B is an illustrative representation of a more detailed network architecture of the 5G network of FIG. 1A.

FIG. 1B is an illustrative representation of a more detailed network architecture 100B of the 5G network of FIG. 1A. As provided in 3GPP standards for 5G (e.g. 3GPP Technical Specifications or "TS" 23.501 and 23.502), network architecture 100B for the 5G network may include an AMF 112, an authentication server function (AUSF) 114, a policy control function (PCF) 116, an SMF 118, and a UPF 120 which may connect to a data network (DN) 122. Other NFs in the 5G network include an NSSF 134, a network exposure function (NEF) 136, a network function (NF) repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again where control plane functionality and common data repositories may be provided by the set of interconnected NFs, each with authorization to access each other's services. With the SBA, each NF service may expose its functionality through a Service Based Interface (SBI) message bus 150. SBI message bus 150 may employ a Representational State Transfer (REST) interface (e.g. using Hypertext Transfer Protocol or "HTTP"/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140. Assuming the role of either service consumer or service producer, these NFs may be self-contained, independent and reusable.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an application function (AF) 140 may connect to the 5G network, for example, via PCF 116. AF 140 may interact with the network via NEF 136 in order to access network capabilities. NEF 136 may securely expose network capabilities and events provided by NFs to AF 140, and may provide a means for AF 140 to securely provide information to the 5G network.

In general, NRF 132 may maintain NF profiles of available NF instances and their associated services, and support a service discovery function for service discovery associated with the NF profiles. NF profiles of NF instances maintained in NRF 132 may include NF instance ID, NF type, network slice identifiers such as NSI ID, NF capacity information, names of supported services, etc. For service discovery, NRF 132 may receive a discovery request from an NF instance and provide information associated with the discovered NF instance to the NF instance in response.

Also as indicated in FIG. 1B, an analytics function such as a network data analytics function (NWDAF) 138 may be provided in the 5G network. Services and interfaces of NWDAF 138 is described in 3GPP Technical Specification (TS) 29.520. NWDAF 138 may be used for data collection and data analytics in centralized manner. NWDAF 138 may use an Nnwdaf interface on the SBI message bus. NWDAF 138 may receive activity data and local analytics from NFs, AFs, or Apps, and/or access data from one or more data repositories or data stores. Resulting analytics may be generated and sent or otherwise provided by NWDAF 138 to the NFs, AFs, or Apps. Also as shown in FIG. 1B, one or more RAN data analytics functions (RAN-DAFs) 105 may be provided in NG-RAN 104, described later in relation to FIG. 10.

In traditional 3G networks, both baseband and RF processing functions were provided in an "all-in-one" base station and distributed at each cell site. After RF processing, mobile signals were fed to antennas via coaxial cables due to the short distance between the base station and antenna. For 4G networks, a centralized RAN (C-RAN) architecture was proposed to separate the baseband processing function from the base station, consolidating the baseband processing function for many radio units into a centralized pool of baseband units (BBUs). Since the fiber distance between the BBU and the radio units may be extended to tens of kilometers, mobile signals were transmitted over digital fiber links via a Common Protocol Radio Interface (CPRI) interface. CPRI is a standard for transporting baseband in-phase and quadrature or "I/Q" signals to a radio unit of the base station.

Figure 2:
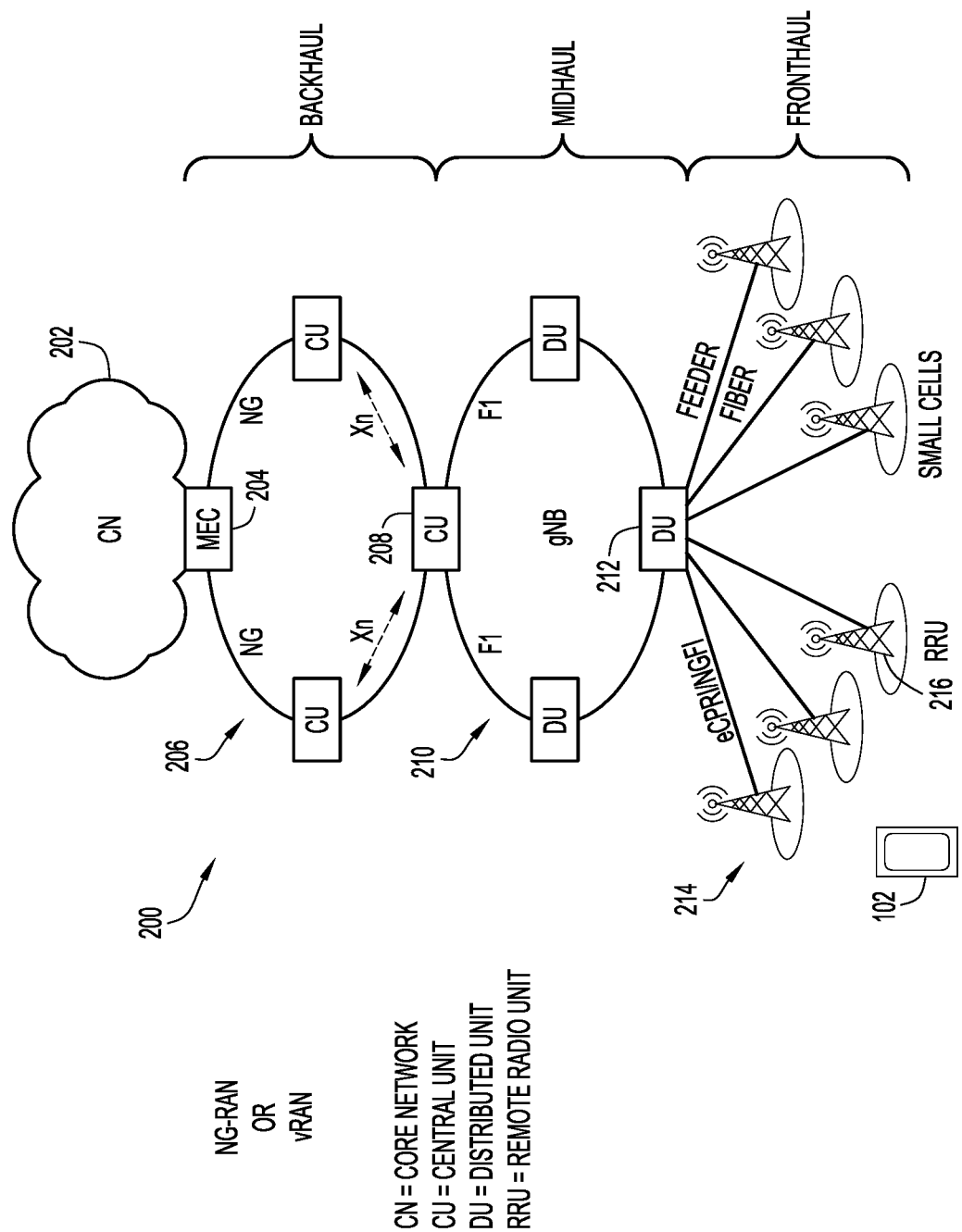
FIG. 2 is an illustrative representation of a Next Generation (NG) Radio Access Network (RAN) (NG-RAN) architecture for the 5G network of FIGS. 1A-1B, where the NG-RAN architecture may comprise a Virtualized RAN (vRAN)

For 5G networks, the 3GPP proposes a Next Generation (NG) RAN architecture with an additional functional split. To illustrate, FIG. 2 is an illustrative representation of an NG-RAN architecture 200 for a 5G network (e.g. the 5G network of FIG. 1B). In NG-RAN architecture 200, baseband processing originally in the BBUs of a C-RAN are now distributed into central units (CUs) 206 (such as CU 208) and distributed units (DUs) 210 (such as a DU 212). Each one of DUs 212 may interface with one or more remote radio units (RRUs) (such as an RRU 216). An RRU may be alternatively referred to as a remote radio head (RRH); an RRU may include or be combined with a remote interface unit (RIU). CUs 206 may communicate with a core network 202 via a multi-access edge compute (MEC) node 204. In some implementations, a cluster of RRUs may be associated with or aggregated into a single DU. In turn, multiple DUs may be associated with or aggregated into a single CU. The architecture may allow the operator to scale the network as the number of cells, frequencies, and user capacity increases.

Figure 3:
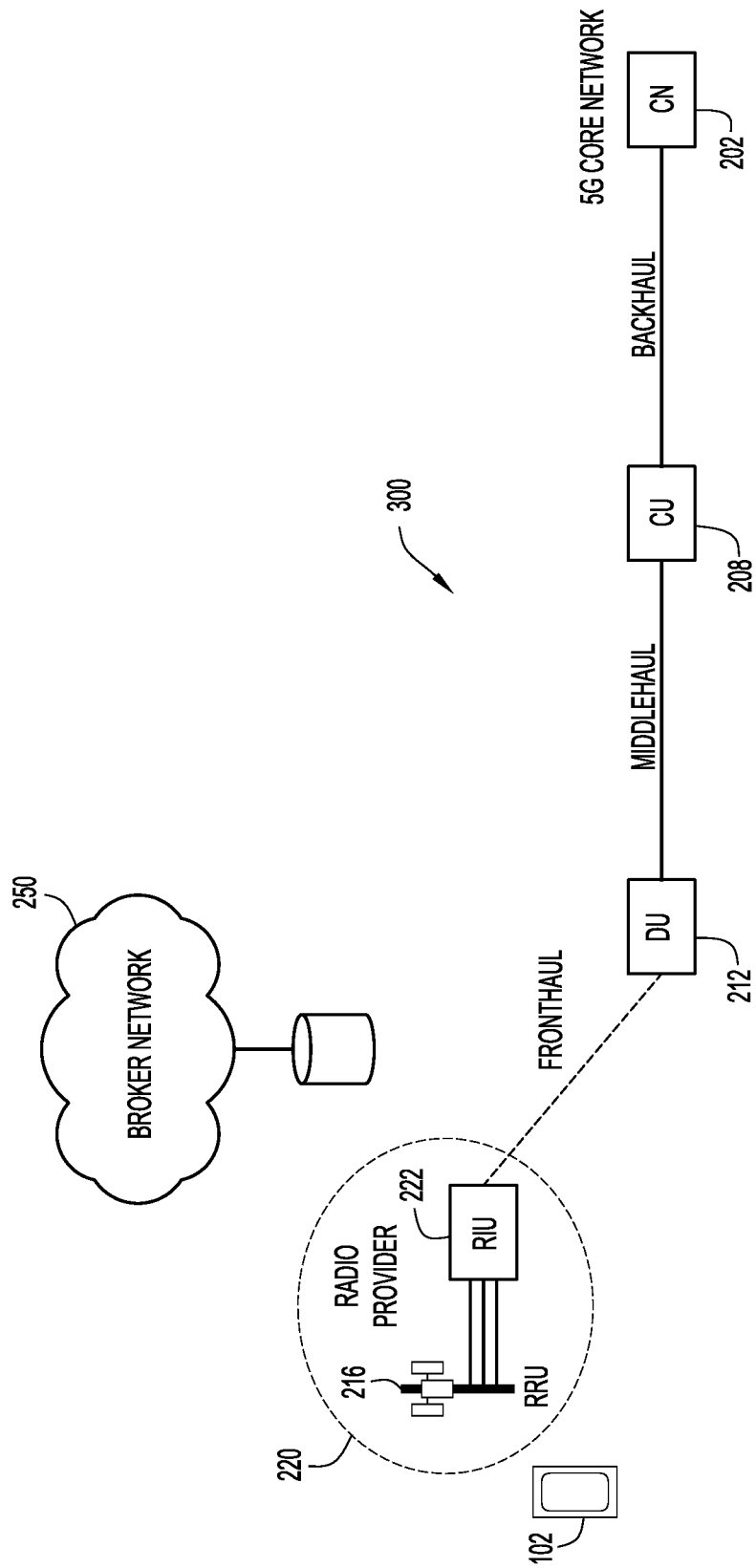
FIG. 3 is an illustrative representation of a network node arrangement of select network nodes of the NG-RAN architecture of FIG. 2.

Select network nodes of NG-RAN architecture 200 of FIG. 2 are shown in an illustrative representation of a network node arrangement 300 in FIG. 3. In FIG. 3, RRU 216 is shown to include or be associated with RIU 222. UE 102 is operative to communicate with RRU 216 which interfaces and communicates with DU 212 via a fronthaul link. As indicated, DU 212 may interface and communicate with CU 208 via a midhaul link. CU 208 may interface and communicate with CN 202 via a backhaul link.

In preferred implementations, the software which implements the RAN functions are decomposed from the hardware. When the software which implements the RAN functions are decomposed from the hardware, a multi-vendor approach may be better facilitated for the benefit of a mobile service provider. Here, CU functions of a cloud RAN deployment may be instantiated on a common server platform (e.g. a mass-produced, Intel x86 server). In some implementations, the functions may be virtualized on a (carrier-grade) Network Functions Virtualization (NFV) software framework or platform. DU functions may also be virtualized on a similar NFV platform depending on availability of the type of transport, or alternatively may be implemented as a network function on a common server platform (e.g. near the cell site).

Thus, in preferred implementations, both the DU and CU functions may be virtualized. Scaling may entail instantiating one or more additional virtualized CU (vCUs) and/or virtualized DU (vDU) functions as Virtual Network Functions (VNFs) on an NFV platform. In alternative approaches, scaling may entail increasing the processing capability of an existing VNF. Advantageously, techniques and mechanisms of the present disclosure may facilitate use of an open and virtualized RAN (vRAN). The mobile service provider may be a MVNO.

As illustrated in FIGS. 2 and 3, NG-RAN architecture 200 provides a division into three (3) domains, interfaces, segments, or links; namely, again, the backhaul link from MEC node 204 to CU 208; the midhaul link from CU 208 to DU 212; and the fronthaul link from DU 212 to RRU 216 (which may be or considered to be a Next Generation Fronthaul Interface or "NGFI"). The fronthaul and midhaul links are the two new additional transport links provided by NG-RAN architecture 200. The fronthaul link may basically involve a transport of time domain or frequency domain baseband samples between the DU and the RRH. In some implementations, the fronthaul link may be implemented over dark fiber. In other implementations, transport techniques that rely on Ethernet, IP, or Wavelength Division Multiplexing (WDM) may be employed. The midhaul link may basically involve a transport of GPRS Tunneling Protocol—User Plane (GTP-u) packets and its associated control plane between the CU and the DU. This type of transport may be implemented over IP.

Such a division involves two functional split interfaces of a radio signal processing stack for NG-RAN architecture 200. The functional split interfaces may include a High Layer Split (HLS) between CU 208 and DU 212, and a Low Layer Split (LLS) between DU 212 and RRU 216. Example functional splits of the radio signal processing stack will be described in more detail later in relation to FIG. 11. In general, for the HLS, "option 2" has been adopted by 3GPP as a standard. For the LLS, there is still discussion among different candidates, which include "option 6," "option 7," and/or "option 8" as proposed by 3GPP, and an enhanced (CPRI) (eCPRI) specification. The eCPRI provides for radio data transmission via a packet-based fronthaul transport network, such as IP or Ethernet. Thus, a two-layer functional split involving upper and lower layers of the radio signal processing stack may employ a fronthaul interface from the cell site towards pre-aggregation locations, where the lower layer may be hosted on a vDU. The upper layer may be hosted on a vCU that gets connected to the vDU via a midhaul interface.

Figure 4:
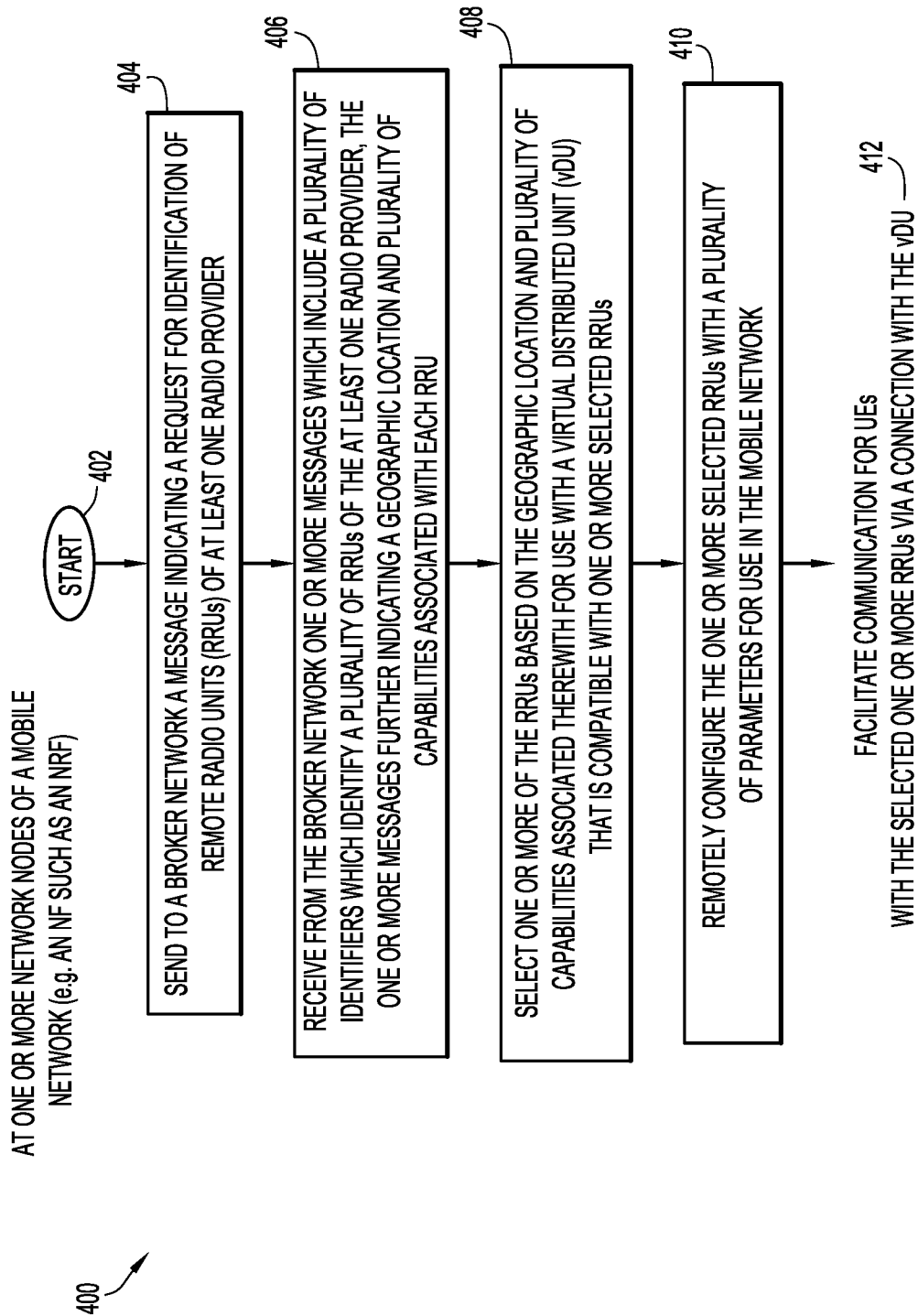

FIG. 4 is a flowchart 400 of a method for facilitating reservation and use of radio resources (e.g. RRUs/RIUs) of radio providers to mobile service providers via a broker network in a vRAN environment according to some implementations of the present disclosure. The broker network may be configured to serve as an intermediary between one or more radio providers and one or more mobile service providers. The method may be performed by a mobile service provider of a mobile network, such as a 5G network. In particular, the method may be performed at one or more network nodes or NFs of the mobile network, which may be or include an NRF. Although the term "RRU" is utilized in the following description, the term may be replaced with "RRU/RIU" associated with the combined RRU/RIU equipment at the cell site. The method may be embodied as a computer program product including a non-transitory computer readable medium and instructions stored in the computer readable medium, where the instructions are executable on one or more processors of the one or more network nodes for performing the steps of the method.

Beginning at a start block 402 of FIG. 4, the network node may send to a broker network a message indicating a request for identification of RRUs of at least one radio provider (step 404 of FIG. 4). The request for identification of RRUs may be a request for identification of RRUs with one or more requirements (e.g. one or more of a location, such as location using geographic coordinates, a radius, radio parameters, or other attributes which may be described herein). In response, the network node may receive from the broker network one or more messages which include a plurality of identifiers which identify a plurality of RRUs of the at least one radio provider (step 406 of FIG. 4). The one or more messages may further indicate a geographic location and a plurality of capabilities associated with each RRU. Each identification of an RRU may also be associated with an identifier of one of a plurality of different radio providers. The network node may then select one or more of the identified RRUs based on the geographic location and the plurality of capabilities of each RRU, for use with a vDU that is compatible with the one or more selected RRUs (step 408 of FIG. 4). The network node may send to the broker network a message indicating the selection of the one or more identified RRUs Communications may then be established between the one or more selected RRUs and the mobile network, where the one or more selected RRUs may be remotely configured with a plurality of parameters for use in the mobile network (step 410 of FIG. 4). Remote configuration may be performed via the vDU and/or vCU. Once the one or more selected RRUs are configured, communication for UEs via the one or more selected RRUs which interface via the DU of the mobile network may be facilitated (step 412 of FIG. 4).

FIG. 5 is a flowchart 500 of a method for facilitating reservation and use of radio resources (e.g. RRUs/RIUs) of radio providers to mobile service providers via a broker network in a vRAN environment according to some implementations of the present disclosure. The broker network may be configured to serve as an intermediary between one or more radio providers and one or more mobile service providers. The method may be performed by one or more servers in the broker network. Again, although the term "RRU" is utilized in the following description, the term may be replaced with "RRU/RIU" associated with the combined RRU/RIU equipment at the cell site. The method may be embodied as a computer program product including a non-transitory computer readable medium and instructions stored in the computer readable medium, where the instructions are executable on one or more processors of the one or more network nodes for performing the steps of the method. A server of the broker network may maintain access to a database which stores identifiers of RRUs in association with their geographic location and capabilities (e.g. pre-populated, prior to access by mobile service providers).

Beginning at a start block 502 of FIG. 5, the server may receive from a mobile network a message indicating a request for identification of RRUs of at least one radio provider (step 504 of FIG. 5). The request for identification of RRUs may be a request for identification of RRUs with one or more requirements (e.g. one or more of a location, such as location using geographic coordinates, a radius, radio parameters, other attributes which may be described herein). In response, the server may select, from a database, a plurality of identifiers which identify a plurality of RRUs of the at least one radio provider and, for each identified RRU, a geographic location and a plurality of capabilities associated therewith (step 506 of FIG. 5). The server may then send to the mobile network one or more messages which include the plurality of identifiers of the RRUs as well as the indications of their geographic location and capabilities (step 508 of FIG. 5). Each identification of an RRU may be associated with an identifier of one of a plurality of different radio providers.

The server may then receive from the mobile network one or more messages indicating a selection of one or more of the RRUs (step 510 of FIG. 5). Here, the one or more messages may also include an address of a vDU that is compatible with the one or more selected RRUs. The server may then send to the one or more selected RRUs a message which triggers the one or more selected RRUs to communicate with the vDU (and/or its associated vCU), where the communication includes a remote configuration of a plurality of parameters in the one or more selected RRUs (step 512 of FIG. 5). Once configured, communication for UEs via the one or more selected RRUs which interface via the vDU of the mobile network may be facilitated.

In alternative implementations, in step 512, the server may send to the vDU (and/or its associated vCU) at its address a message which triggers the vDU (and/or its associated vCU) to communicate with the one or more selected RRUs, where the communication includes the remote configuration of the plurality of parameters in the one or more selected RRUs.

In the method of FIGS. 4 and 5, the plurality of capabilities of an RRU may include one or more of the following: a radio frequency (RF) band, a bandwidth, a sampling rate, a buffer memory size, a hardware capability, a hardware version number, and a software version number. In some implementations, the plurality of capabilities of an RRU may include an identification of a type of a fronthaul interface of the RRU (e.g. CPRI or eCPRI), or an identification of a functional split of the RRU, where the identification of the functional split indicates at least one of split option 7 or split option 8. Note that such an identification may be used to ensure compatibles between the RRU and the vDU. Other variants of the interfaces, links, and or functional splits may be realized and adopted, and these variants may also be identified for compatibility and proper RRU selection and/or vDU selection or functional adjustments. Even further, the plurality of parameters to be configured in a RRU may include one or more of the following: a center frequency, a bandwidth, a sampling frequency, an available filter, a Fast Fourier Transform (FFT) size, a Cyclic Prefix (CP) length, an antenna mapping, an Automatic Gain Control (AGC) parameter, and a transmission constellation.

FIGS. 6A-6F are illustrative representations of network node arrangements of the NG-RAN architecture, for use in describing example scenarios of use of radio resources of radio providers to mobile service providers via a broker network in a vRAN environment according to some implementations of the present disclosure.

Figure 6A:
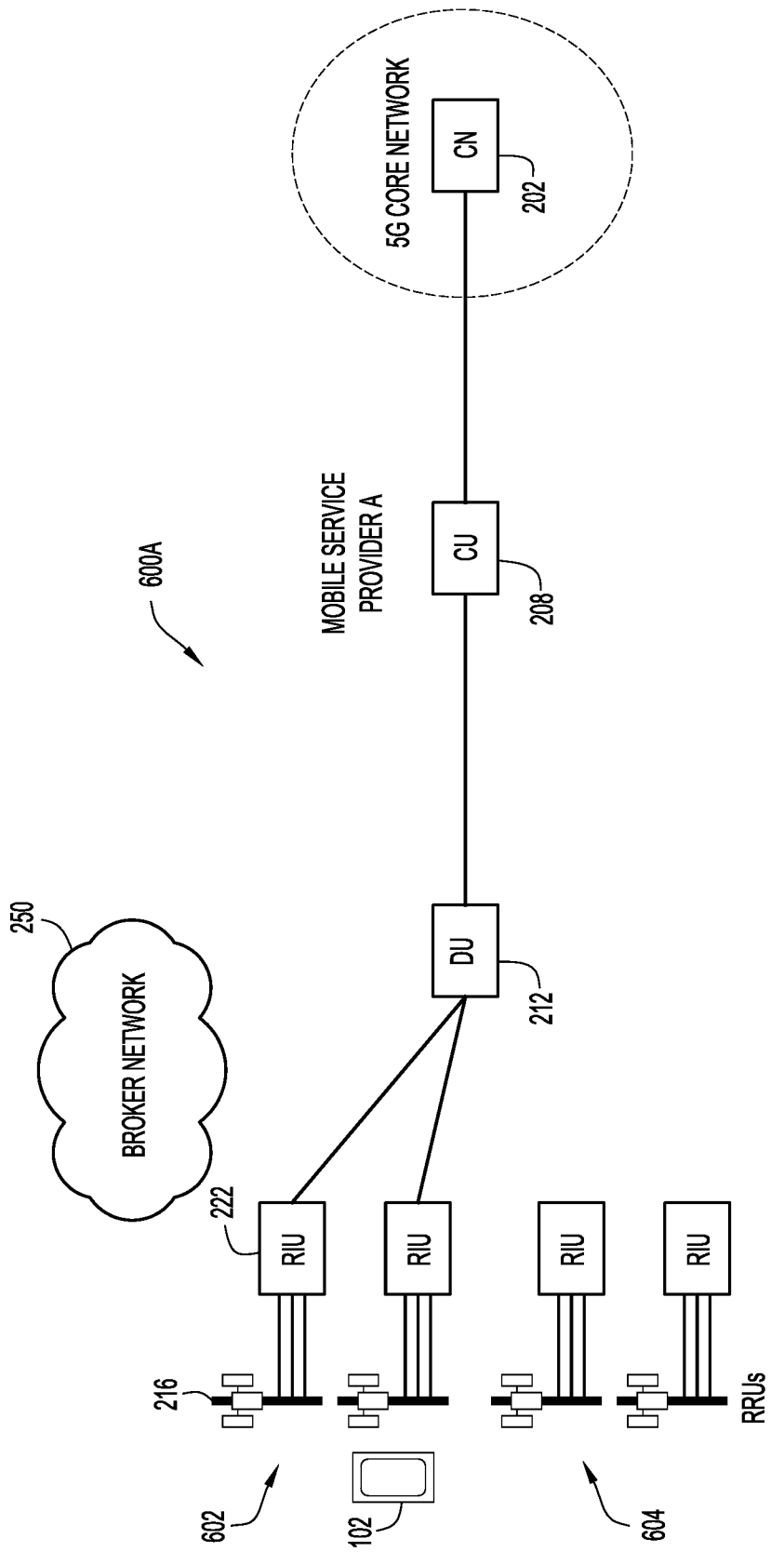
Figure 6B:
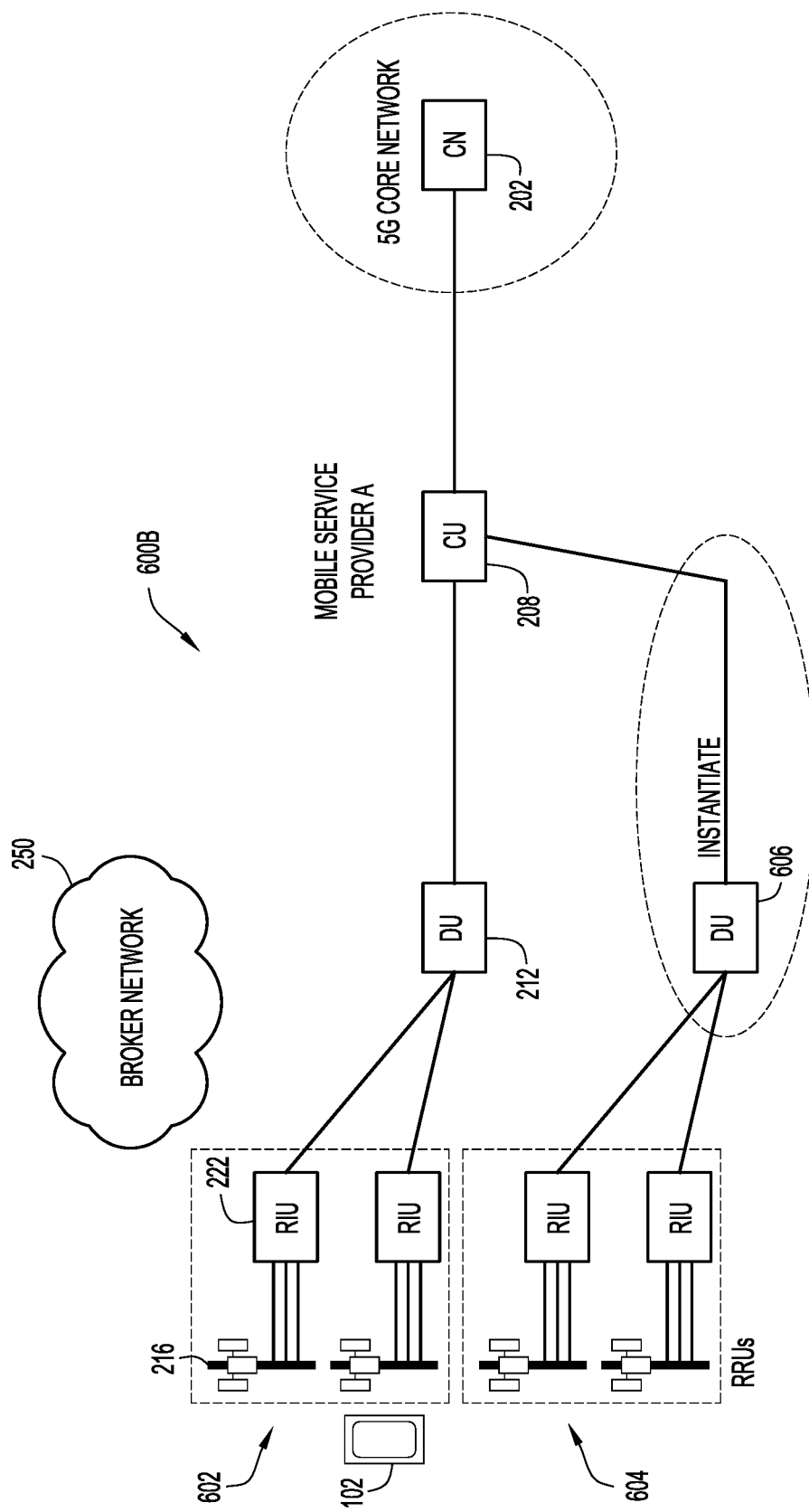
Figure 6C:
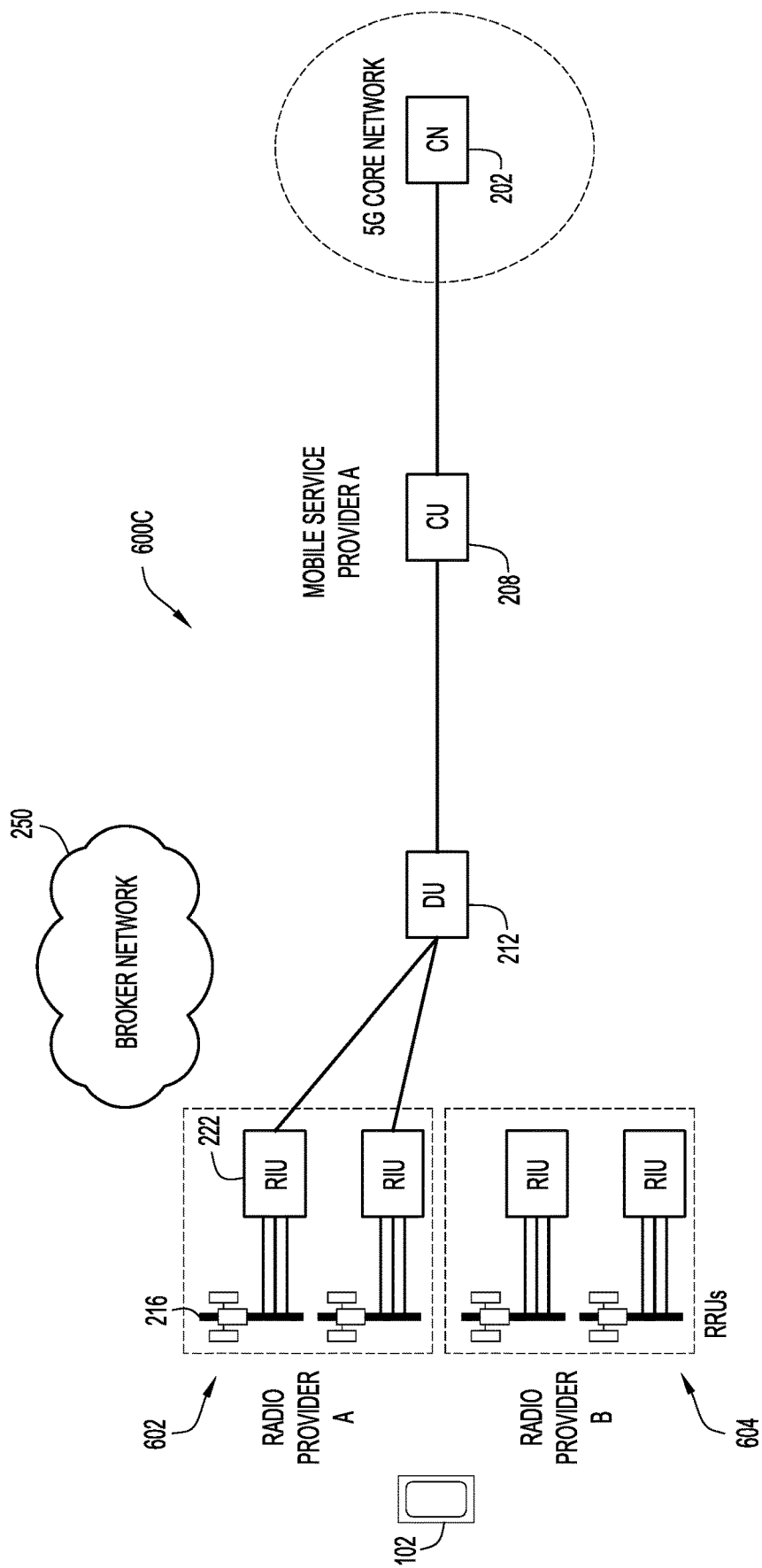
Figure 6E:
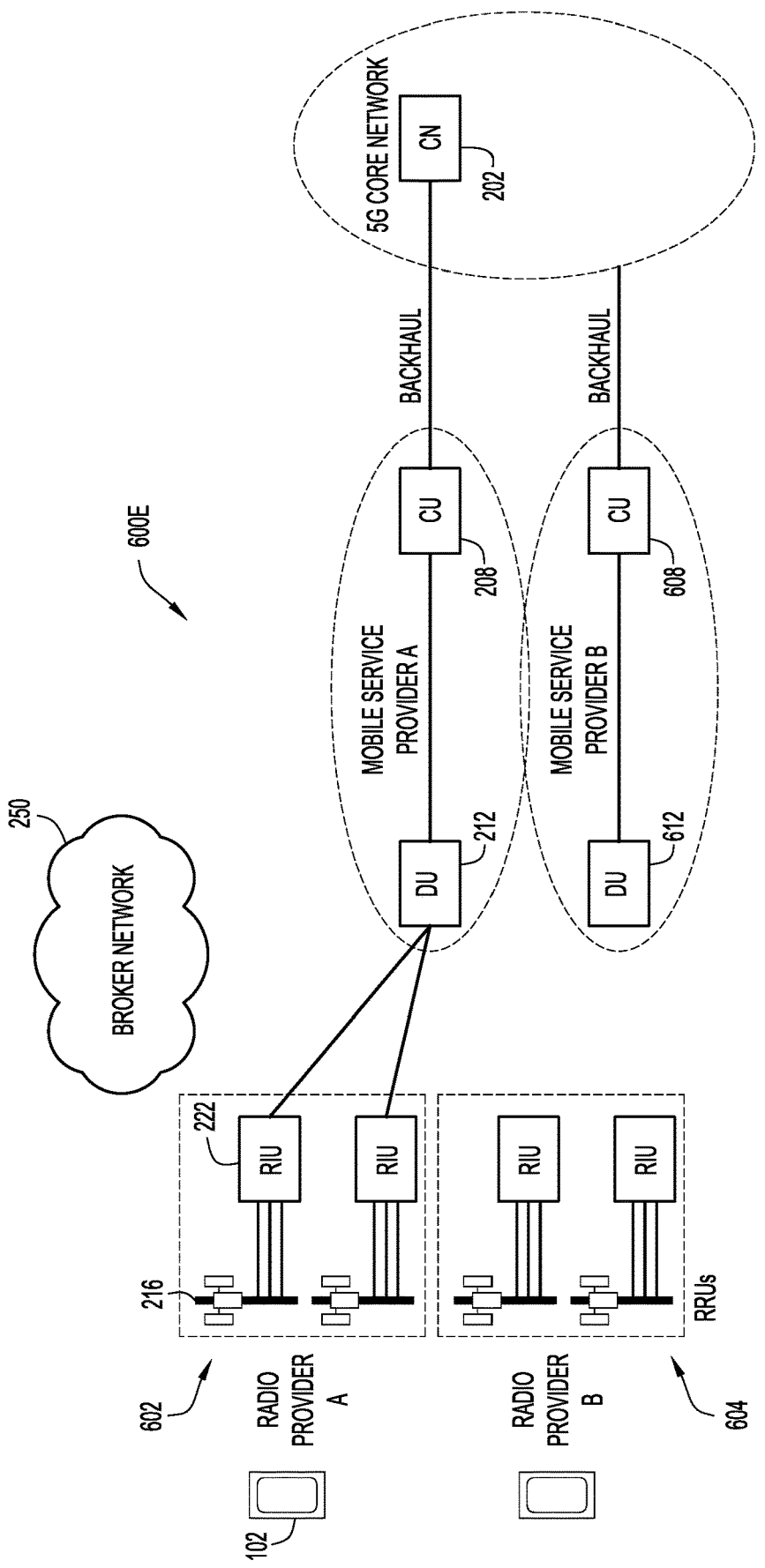
Figure 6F:
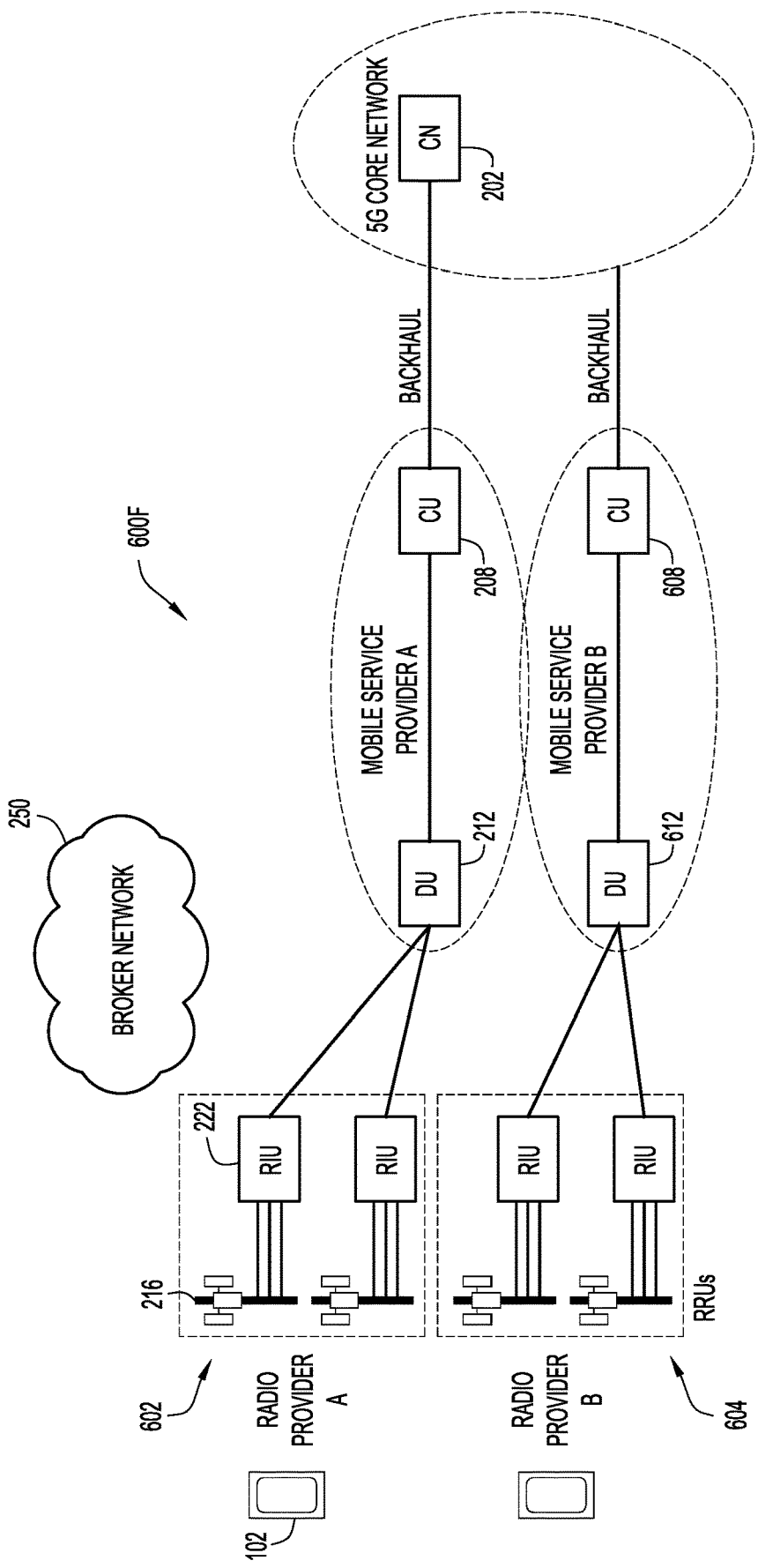

In a network node arrangement 600A of FIG. 6A, it is shown that a mobile server provider A may operate a plurality of RRUs 602 which are connected to and controlled via DU 212 which is connected to and controlled via CU 208. Subsequently, as shown in a network node arrangement 600B of FIG. 6B, the mobile server provider A may obtain use of and operate a plurality of additional RRUs 604 of a radio provider through broker network 250. Here, the additional RRUs 604 may be connected to and controlled via a DU 606 which is connected to and controlled via CU 208. DU 606 may be newly-instantiated (e.g. as a vDU) by the mobile server provider A as a result or anticipation of obtaining the additional RRUs 604. The additional RRUs 604 may be obtained in order to provide increased capacity or extended coverage for the mobile server provider A. The mobile server provider A may release the additional RRUs 604 from broker network 250 in a reverse fashion.

In a network node arrangement 600C of FIG. 6C, it is again shown that the mobile service provider A may operate plurality of RRUs 602 which are connected to and controlled via DU 212 which is connected to and controlled via CU 208. These RRUs 602 are provided by a radio provider A. Subsequently, as shown in a network node arrangement 600D of FIG. 6D, the mobile server provider A may obtain use of and operate the plurality of additional RRUs 604 of a different radio provider, namely a radio provider B, through broker network 250. Here, the additional RRUs 604 may be connected to and controlled via existing DU 212 which is connected to and controlled via CU 208. The additional RRUs 604 may be obtained in order to provide increased capacity or extended coverage for the mobile server provider A. The mobile server provider A may release the additional RRUs 604 of radio provider B from broker network 250 in a reverse fashion.

In a network node arrangement 600E of FIG. 6E, it is again shown that the mobile server provider A may operate plurality of RRUs 602 which are connected to and controlled via DU 212 which is connected to and controlled via CU 208. These RRUs 602 are provided by the radio provider A. A different mobile service provider, namely, a mobile service provider B, may have a CU 608 and a DU 612 deployed for use. The mobile service provider B may wish to obtain use of radio resources in the same or different geographic region. Subsequently, as shown in a network node arrangement 600F of FIG. 6F, the mobile server provider B may obtain use of and operate the plurality of additional RRUs 604 of the radio provider B through broker network 250. Here, the additional RRUs 604 may be connected to and controlled via DU 612 which is connected to and controlled via CU 608. In some implementations, DU 612 may be newly-instantiated (e.g. as a vDU) by the mobile server provider B as a result or in anticipation of obtaining the additional RRUs 604. The mobile server provider B may release the additional RRUs 604 of radio provider B from broker network 250 in a reverse fashion.

In some implementations, the techniques of FIGS. 4, 5, and 6A-6F (and elsewhere herein) may be applied for use with different transport network providers in addition to or instead of different mobile service providers.

Figure 7:
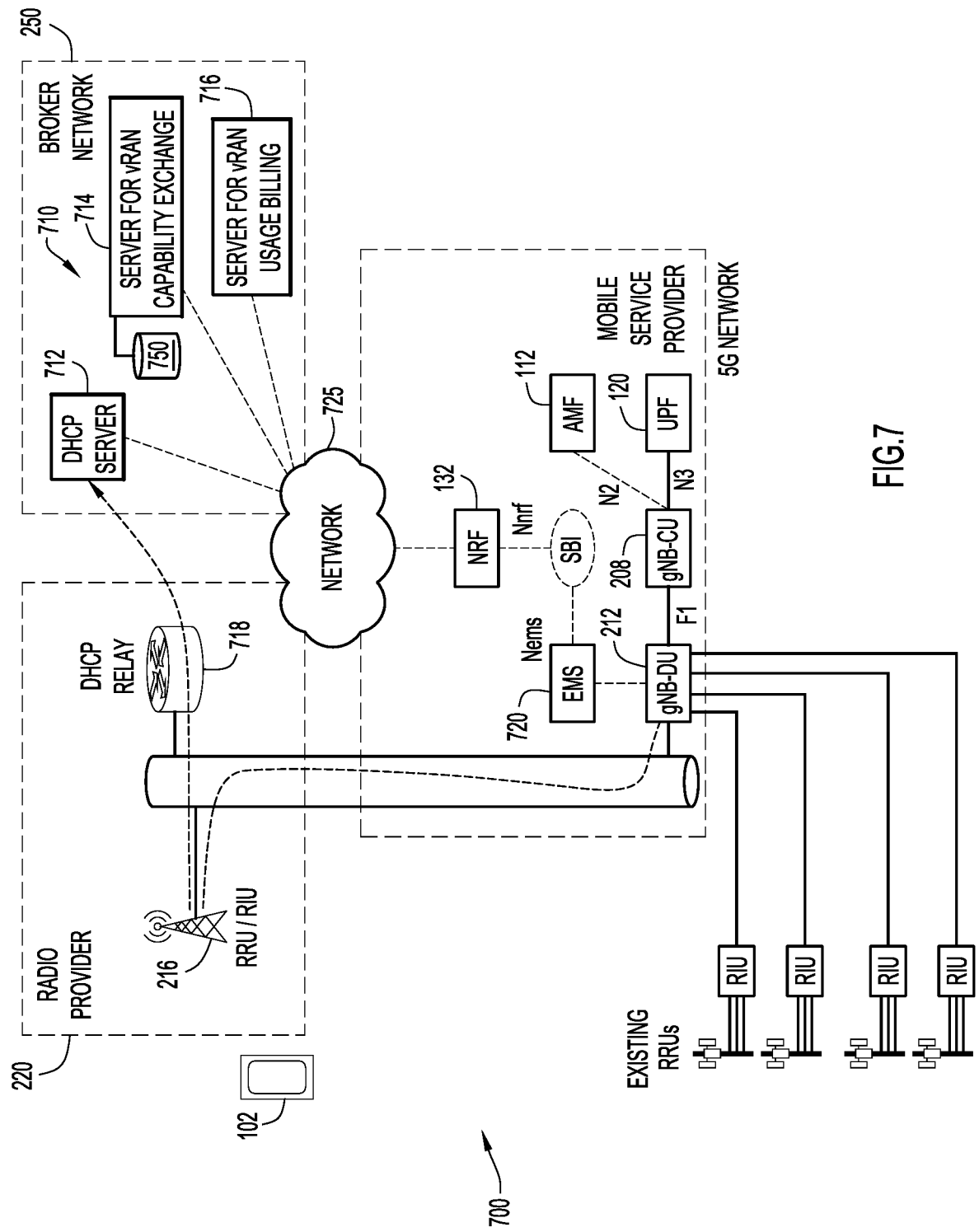
FIG. 7 is an illustrative representation of a system for use in facilitating reservation and use of radio resources of radio providers to mobile service providers via a broker network in a vRAN environment according to some implementations of the present disclosure.

FIG. 7 is an illustrative representation of a system 700 for facilitating reservation and use of radio resources of radio providers to mobile service providers via a broker network in a vRAN environment according to some implementations of the present disclosure. In system 700, broker network 250 may be configured to serve as an intermediary between one or more radio providers and one or more mobile service providers. Broker network 250 may be used to facilitate the reservation and use of radio resources (e.g. RRUs) in a network of radio provider 220 by a mobile server provider of the 5G network through a network 725. Broker network 250 may be a cloud network or a cloud-based network, providing a cloud-hosted portal for a mobile service provider. RRU 216 (and/or its associated RIU) may include a "capability agent" configured to perform functions and communications as described herein. In preferred implements, the capability agent is a "light-weight" agent provided in RIU 222. System 700 of FIG. 7 is an example system which may be utilized in the methods to be described later in relation to call flows of FIGS. 8A-8B and 9. Example interfaces, connections, and/or links between networks and elements in system 700 are illustrated in FIG. 7.

In some implementations, many or most of the DUs may be deployed either in enterprise premises or residential premises. RRUs/RIUs may be mounted on roofs or pole tops, and shared across multiple transport providers, mobile service providers, or across both, according to some implementations of the present disclosure.

Select network nodes or elements are shown in the 5G network of FIG. 7. Here, one or more NFs may be used to facilitate the reservation and use of the radio resources. In preferred implementations, the one or more NFs used to perform such procedures is or includes NRF 132 of the 5G network. As described previously, NRF 132 may maintain NF profiles of available NF instances and their associated services, and support a service discovery function for service discovery associated with the NF profiles. The NF profiles of NF instances maintained in NRF 132 may include NF instance ID, NF type, network slice identifiers such as NSI ID, NF capacity information, names of supported services, etc. For service discovery, NRF 132 may receive a discovery request from an NF instance and provide information associated with the discovered NF instance to the NF instance in response. According to some implementations, NRF 132 may provide service and functionality in the same manner, albeit adapted and/or modified to facilitate the reservation and use of the radio resources as described herein. NRF 132 may include functionality for creating and/or maintaining profiles associated with RRUs, which may include relevant information (conventional or otherwise as described herein) for use and/or association with vDUs of the mobile service provider.

Broker network 250 of FIG. 7 may include a server 714 ("server for vRAN capability exchange") which is configured to facilitate reservation and use of radio resources (e.g. RRUs) of radio provider 220 by the mobile server provider of the 5G network. In preferred implementations, server 714 of broker network 250 may be configured to facilitate the reservation and use of radio resources in networks of one or more (e.g. multiple) different radio providers or vendors by one or more (e.g. multiple) different mobile server providers. Server 714 may achieve this at least in part by coordinating and/or controlling the various procedures involved for the reservation and use of RRUs, including a communicating of capabilities of RRUs of multiple different radio providers to any given mobile service provider.

Server 714 of broker network may maintain access to a database 750 for storing and retrieving data. Database 750 may store a plurality of identifiers of RRUs of one or more radio providers (e.g. an identifier of RRU 216 of radio provider 220). Each identifier of an RRU may be stored in association with a geographic location of the RRU and a plurality of capabilities of the RRU. Each identifier of an RRU may also be associated with an identifier of one of a plurality of different radio providers. Each identifier of an RRU may also be stored in association with a marking or indication of whether the RRU is available or unavailable (i.e. reserved for use).

Server 714 of broker network 250 may be used for obtaining capabilities and other information of RRUs/RIUs of most or all radio providers, and storing such capabilities and information in association with identifiers of the RRUs/RIUs in database 750. In preferred implementations, server 714 of broker network 250 may be configured to request and receive capabilities and information of RRUs/RIUs directly from the RRUs/RIUs, for example, using the capability agents of the RRUs/RIUs. The capabilities of an RRU/RIU may include a number of antennas, antenna tilt, supported RF bands, RF bandwidths, sampling rate, buffer memory, hardware capabilities, hardware version number, software version number, etc. Some management operations associated with RRUs/RIUs may include query features; for example, RRUs/RIUs may be queried for log and statistics, as well as for its location (e.g. GPS and/or geographic coordinates). Management operations may further include resetting or restarting an RRU, pushing software updates to an RRU, and placing an RRU in idle mode. Management operations may also be used for diagnostic and assess purposes, such as for reporting errors, log, and statistics.

An RRU/RIU may be configured, managed, and/or controlled by an associated CU and/or DU, or alternatively be configured, managed, and/or controlled by a separate controller. The CU/DU may utilize management and/or operation protocols to remotely configure or set one or more parameters of an RRU. A list of some example parameters for configuring an RRU may include a center frequency (band), a bandwidth (for uplink and downlink), a sampling frequency, filter availability (for transmission and reception, analog or digital), FFT size and CP length, antenna mappings, AGC parameters, constellation point information, etc.

Broker network 250 of FIG. 7 may also include a server for assigning or obtaining addresses, such as a Dynamic Host Configuration Protocol (DHCP) server 712. DHCP server 712 may be configured to assign IP addresses (e.g. to RRUs, and/or to NEs or NFs such as DUs and/or CUs) for establishing communications between units (i.e. layer-3 or "L3" communications), so that RRUs may be remotely configured for use in a 5G network of a mobile service provider. An RRU may be connected to a network segment for communicating (i.e. layer-2 or "L2" communications) with DHCP server 712 via a DHCP relay 718.

Broker network 250 of FIG. 7 may further include a server 716 which may be referred to as a server for vRAN usage billing. Server 716 may be configured to perform actions relating to charging or billing, monitoring RRU usage for billing purposes. The actions may be or include creating a record having information related to charging or billing, or documenting the service for charging or billing. Alternatively, the actions may be or include sending a message to a charging or monitoring function for creating such a record, etc. The actions may be or include causing records to be open or closed in the monitoring of RRU usage.

In some implementations, the 5G network of FIG. 7 is also shown to include an Element Management System (EMS) 720 which may be utilized to facilitate reservation and use of radio resources (e.g. RRUs). EMS 720 shown in the 5G network may include systems and applications for managing (NE) on a Network Element-management Layer (NEL) of the Telecommunications Management Network (TMN) model. Functionality provided by EMS 720 may be divided into five areas, namely, fault, configuration, accounting, performance and security (FCAPS). Northbound, EMS 720 may interface to network management systems and/or service management systems depending on the deployment scenario. Southbound, EMS 720 may communicate with devices. EMS 720 may manage the functions and capabilities within each NE. EMS 720 may be a foundation to implement TMN-layered, Operations Support System (OSS) architectures that enable service providers to meet customer needs for rapid deployment of new services. In some implementations, EMS 720 may be utilized as described to facilitate the reservation and use of radio resources according to the present disclosure.

In some implementations, at least servers 714 and 716 of broker network 250 may be utilized in methods to be described below in relation to call flows of FIGS. 8A-8B and 9.

Figure 8A:
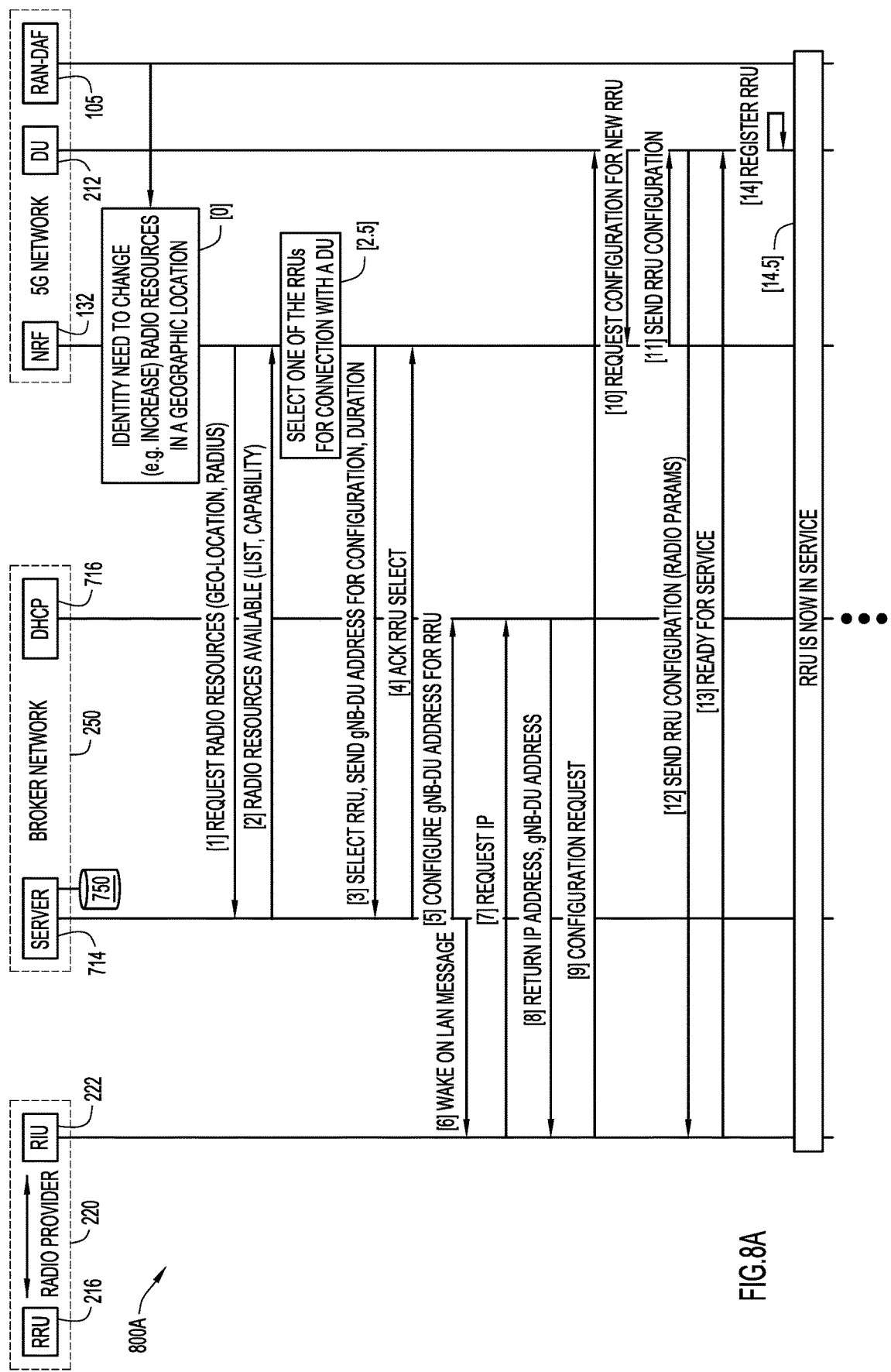
FIGS. 8A and 8B are call flow diagrams for describing a method of facilitating reservation and use of radio resources of radio providers to mobile service providers via a broker network in a vRAN environment according to some implementations of the present disclosure.
Figure 8B:
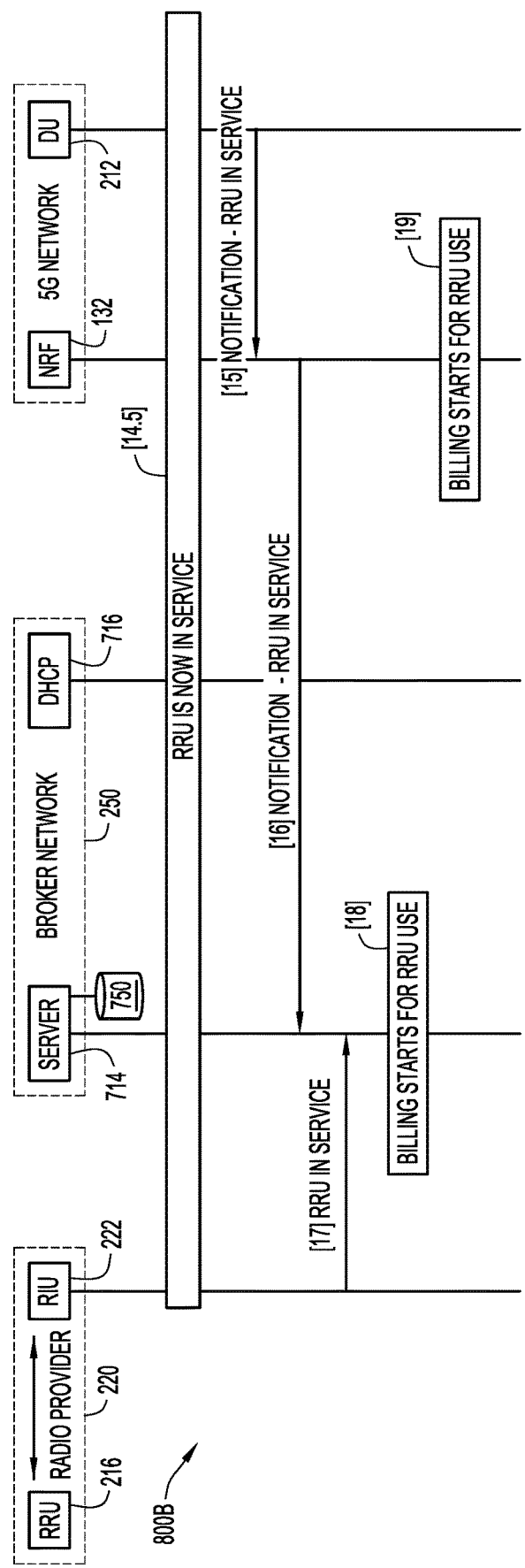

FIGS. 8A and 8B are call flow diagrams 800A and 800B for describing methods for facilitating reservation and use of radio resources (e.g. RRUs/RIUs) of radio providers to mobile service providers via a broker network in a vRAN environment according to some implementations of the present disclosure. In some implementations, the methods of FIGS. 8A-8B may be a more specific implementation of methods previously described in relation to FIGS. 4 and 5, merely providing optional or additional implementation details. The methods of FIG. 8A-8B may be performed in system 700 described in relation to FIG. 7 or other suitable system. The methods may be performed by one or more network nodes of a mobile (e.g. 5G) network and/or one or more servers in a broker network. Each RRU (and/or RIU) may include a "capability agent" configured to perform functions and communications as described herein. The method may be embodied as a computer program product including a non-transitory computer readable medium and instructions stored in the computer readable medium, where the instructions are executable on one or more processors of the one or more network nodes/servers for performing the steps of the method.

The server of the broker network may maintain access to a database which stores identifiers of RRUs in association with their geographic location and capabilities; this database may be pre-populated with the geographic location and capabilities for each RRU/RIU from prior communications via the capability agent of the RRU/RIU. Although the term "RRU" is utilized in the following description, the term may be replaced with "RRU/RIU" associated with the combined RRU/RIU equipment at the cell site. Although only (a single) RRU 216 is described in the method, it is understood that a plurality of RRUs may be involved in the method.

In call flow 800A of FIG. 8A, NRF 132 or other NF may identify a need to change radio resources in a particular geographic location (step 0 of FIG. 8A). In general, the need to change radio resources may relate to a need to increase or decrease the number of radio resources. In the present example, NRF 132 identifies a need to increase the number of radio resources. In some implementations, the need to change (e.g. increase) radio resources may be identified based on analytics data obtained from RAN-DAF 105, described later in relation to FIG. 10.

In response, NRF 132 may send to server 714 of broker network 250 a message indicating a request for identification of (available) RRUs of at least one radio provider (step 1 of FIG. 8A). In some implementations, the request includes requirements, such as a geographic location, one or more capabilities, identifiers of one or more radio providers, or any combination of the above or as described herein. In the present example, the request includes a geographic location (e.g. geographic coordinates) and a radius of the geographic location. In response to receiving the message, server 714 of broker network 250 may select, from its database 750, a plurality of identifiers which identify a plurality of RRUs of at least one radio provider for satisfying the request. A geographic location and a plurality of capabilities associated with the identified RRUs may also be obtained. Server 714 of broker network 250 may then send to NRF 132 one or more messages which include the plurality of identifiers of the RRUs as well as indications of the geographic location and the plurality of capabilities (step 2 of FIG. 8A). In some implementations, the request or query received may prompt a temporary reservation for assessment for a predetermined time period (e.g. to avoid conflicts between different mobile service providers). Note also that, in some implementations, RRUs that are available and unreserved remain powered down and/or in a sleep or low power mode of operation.

In response to receiving the one or more messages, NRF 132 may select one or more of the identified RRUs based on the geographic location and the plurality of capabilities of each RRU (step 2.5 of FIG. 8A). NRF 132 may select the one or more identified RRUs for use with a vDU (e.g. an instantiation) that is compatible with the one or more identified RRUs. NRF 132 may then send to server 714 of broker network 250 one or more messages indicating a selection of the one or more identified RRUs (step 3 of FIG. 8A). These one or more messages may indicate an (implicit or explicit) request to reserve the one or more selected RRUs for use by the mobile service provider. The request will ultimately result in a registration of the one or more selected RRUs in the 5G network. The reservation of the one or more selected RRUs may be for exclusive use and operation with the mobile service provider (e.g. for a duration of time). Server 714 of broker network 250 may mark in its database 750 an indication that RRU 216 is unavailable or reserved; now, other mobile server providers are prohibited from registering and using RRU 216, at least for the duration of the reservation.

In response, server 714 of broker network 250 may send to NRF 132 a message indicating an acknowledgement of the RRU selection (step 4 of FIG. 8A). In response, NRF 132 may create profile information associated with RRU 216, or mark RRU 216 as available in any existing profile information associated with RRU 216. Profile information associated with RRU 216 may be accessible to NFs and may be or include one or more of standard profile information, an identifier or address of RRU 216, the parameters associated with RRU 216, and configuration information for RRU 216. The profile information associated with RRU 216 may be updated, or alternatively created, upon receipt of its IP address and/or confirmation of its service readiness.

In some implementations, the one or more messages indicating the reservation request in step 3 of FIG. 8A may include or indicate a selected duration of time of the reservation (e.g. hours, days, one or more months, one or more years, etc.). The one or more messages may include an identifier or address (e.g. IP address) of the vDU that is compatible with the one or more selected RRUs. The identifier or address (e.g. IP address) may be included for configuring the vDU with the one or more selected RRUs. Server 714 of broker network 250 may send to DHCP server 712 a message which includes the IP address associated with DU 212 (or the CU) (step 5 of FIG. 8A). In response to receiving the message, DHCP server 712 may store the IP address associated with DU 212 together with an identifier or (e.g. pre-reserved) IP address of RRU 216.

The one or more selected RRUs indicated in the one or more messages of step 3 of FIG. 8A may be or include RRU 216. RRU 216 may be powered down or in a sleep or low power mode of operation, as it was unreserved and not in operation for UE communications. In response to receiving the one or more messages of step 3 of FIG. 8A, server 714 of broker network 250 may send to RRU 216 a message to "wake-up" RRU 216 (step 6 of FIG. 8A).

In some implementations, the message may be a message which is a "Wake-on-LAN" message. In general, a Wake-on-LAN (WoL) message may be based on an Ethernet or token-ring computer networking standard that allows a device to be turned on or awakened by a network message.

Equivalent terms include wake-on-WAN, remote-wake-up, power-on-by-LAN, etc. Other message types or names may be used, for example, including a Wake-on-Wireless LAN (WoWLAN) where the device being awakened is communicating via wireless or Wi-Fi. In this specific implementation, the wake-on-LAN feature may be or be considered as a Wake-on-LAN enhancement for service discovery for RRUs/RIUs. In some implementations, the RRU/RIU may include a physical Wake-on-LAN connector as well as the capability agent.

The message in step 6 is used as a message which triggers the one or more selected RRUs to communicate with DU 212 (or the CU), although many other suitable types of messages may be utilized. In response to receiving the message, RRU 216 may wake up from the sleep or low power mode and send to DHCP server 716 a message indicating a request for IP address(es) (step 7 of FIG. 8A). DHCP relay 718 (FIG. 7) may be utilized for such communications. In response to receiving the message, DHCP server 716 may retrieve an IP address which is assigned to RRU 216 as well as the IP address associated with DU 212 (or the CU). DHCP server 716 may then send or return to RRU 216 one or more messages which include the IP address assigned to RRU 216 and the IP address associated with DU 212 (or the CU) (step 8 of FIG. 8A).

In response to receiving the one or more messages from DHCP server 716, RRU 216 may send to DU 212 (or the CU) a message indicating a request for configuration (step 9 of FIG. 8A). In response to receiving the message, DU 212 (or the CU) may send to NRF 132 a message indicating a request for configuring RRU 216 with a plurality of parameters (step 10 of FIG. 8A). NRF 132 may retrieve a plurality of parameters for configuring RRU 216 and send or return to DU 212 (or the CU) one or more message including the plurality of parameters for configuring RRU 216 (step 11 of FIG. 8A). Then, DU 212 (or the CU) may remotely configure RRU 216 with the plurality of parameters so that RRU 216 may operate in the 5G network (step 12 of FIG. 8A). In some implementations, at least some of the steps and messaging for the above-described procedure may include zero-touch provisioning steps outlined in standard documents such as 3GPP Technical Specification (TS) 32.508 and/or 32.509.

After successful configuration, RRU 216 may then send to DU 212 (or the CU) a message indicating that it is ready for service (step 13 of FIG. 8A). DU 212 (or the CU) may then register RRU 216 (step 14 of FIG. 8A). RRU 216 is now in service with the 5G network (step 14.5 of FIG. 8A). Communication for UEs via the RRU 216 which interfaces via DU 212 of the 5G network may be facilitated.

Continuing in call flow 800B of FIG. 8B, DU 212 (or the CU) may then send to NRF 132 a message indicating a notification or confirmation that RRU 216 is in service (step 15 of FIG. 8B). In response to receiving the message, NRF 132 may send to server 714 of broker network 250 a corresponding message indicating a notification or configuration RRU 216 is in service (step 16 of FIG. 8B). Additionally or alternatively, RRU 216 may send to server 714 of broker network 250 a message indicating a notification or confirmation that RRU 216 is in service (step 17 of FIG. 8B).

Server 714 may then perform an action to indicate a beginning of a charging or billing event (step 18 of FIG. 8B). Similarly, NRF 132 may perform an action to indicate a beginning of a charging or billing event (step 19 of FIG. 8B). An action to indicate a beginning of the charging or billing event may be or include creating or opening a record having information related to charging or billing, or documenting the service for charging or billing. Alternatively, the action may be or include sending a message to a charging or monitoring function for creating or opening such a record, etc. The information may be or include an identifier or serial number of the RRU or RIU, a bandwidth of a fronthaul link or eCPRI with the RRU/RIU, or Quality of Service or "QoS" of L2 or L3 communications, a timestamp which includes a date and/or time, a predetermined time period, etc. In at least some implementations, the messages in steps 16 and/or 17 of FIG. 8B may alternatively be communicated to server 716 for vRAN usage billing (see e.g. FIG. 7) directly or through a corresponding message sent from server 714 upon its receipt.

In the method of FIGS. 8A and 8B, the plurality of capabilities of an RRU may include one or more of the following: an RF band, a bandwidth, a sampling rate, a buffer memory size, a hardware capability, a hardware version number, and a software version number. In some implementations, the plurality of capabilities of an RRU may include an identification of a type of a fronthaul interface of the RRU (e.g. CPRI or eCPRI), or an identification of a functional split of the RRU, where the identification of the functional split indicates at least one of split option 7 or split option 8; such an identification may be used to ensure compatibilities between the RRU and the vDU. Even further, the plurality of parameters to be configured in a RRU may include one or more of the following: a center frequency, a bandwidth, a sampling frequency, an available filter, a FFT size, a CP length, an antenna mapping, an AGC parameter, and a transmission constellation.

Figure 9:
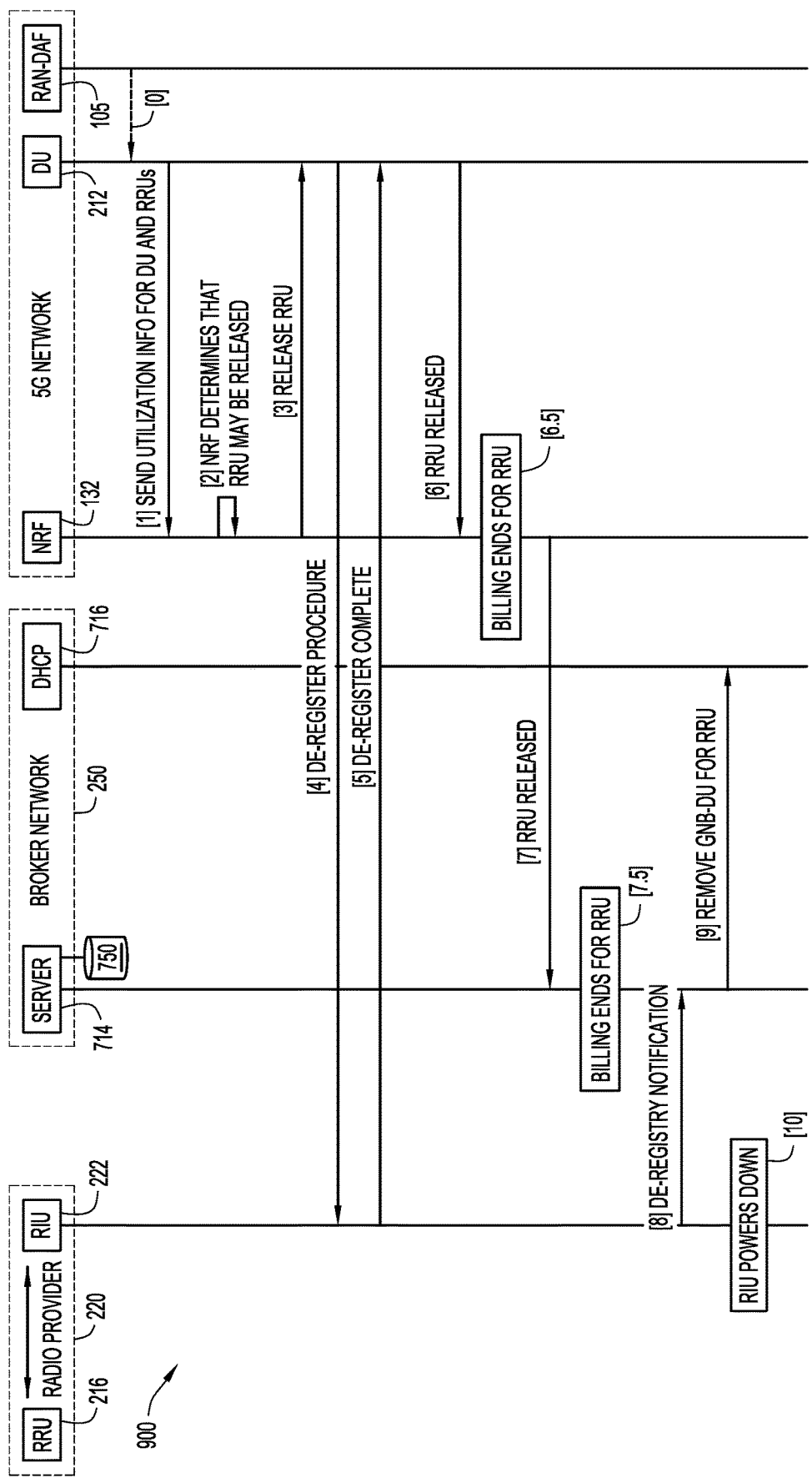
FIG. 9 is a call flow diagram for describing a method of releasing radio resources of radio providers from mobile service providers via a broker network in a vRAN environment according to some implementations of the present disclosure.

FIG. 9 is a call flow diagram 900 for describing a method for releasing radio resources (e.g. RRUs/RIUs) of radio providers to mobile service providers via a broker network in a vRAN environment according to some implementations of the present disclosure. The method may follow the methods described previously in relation to FIGS. 8A-8B for releasing RRU 216 from use. As will become apparent, the methods may be performed by one or more network nodes of a mobile (e.g. 5G) network and/or one or more servers in a broker network. The method may be embodied as a computer program product including a non-transitory computer readable medium and instructions stored in the computer readable medium, where the instructions are executable on one or more processors of the one or more network nodes/servers for performing the steps of the method. Although the term "RRU" is utilized in the following description, the term may be replaced with "RRU/RIU" associated with the combined RRU/RIU equipment at the cell site. Although only (a single) RRU 216 is described in the method, it is understood that a plurality of RRUs may be involved in the method.

In call flow 900 of FIG. 9, DU 212 (or the CU) may send to NRF 132 one or more messages which include usage or utilization information associated with DU 212 and/or RRU 216 (step 1 of FIG. 9). Based this information, NRF 132 or other NF may identify a need to change radio resources in a particular geographic location. In general, the need to change radio resources may relate to a need to increase or decrease the number of radio resources. In the present example, NRF 132 identifies a need to decrease radio resources and, in this case, release the use of RRU 216 (step 2 of FIG. 9). In some implementations, the need to change (e.g. decrease) radio resources may be identified based on analytics data obtained from RAN-DAF 105 (step 0 of FIG. 9), described later in relation to FIG. 10. NRF 132 may send to DU 212 (or the CU) a message indicating a request to release RRU 216 (step 3 of FIG. 9).

In response to receiving the message, DU 212 (or the CU) may send to RRU 216 a message indicating a request to de-register (step 4 of FIG. 9). In response to receiving the message, RRU 216 may perform tasks for deregistration and/or deconfiguration (e.g. "clearing" its configuration) from use with DU 212 (or the CU) and/or the 5G network. RRU 216 may send to DU 212 (or the CU) a message indicating a completion or acknowledgement of the message for deregistration (step 5 of FIG. 9). In response to receiving the message, DU 212 may send to NRF 132 a message indicating a completion or acknowledgement of the message for releasing RRU 216 (step 6 of FIG. 9).

In response, NRF 132 may delete any profile information associated with RRU 216 or mark the RRU 216 as unavailable in the profile information. Further, NRF 132 may perform an action to indicate an ending of the charging or billing event (step 6.5 of FIG. 9). NRF 132 may also send to server 714 of broker network a message indicating a request for releasing RRU 216 (step 7 of FIG. 9). Server 714 of broker network 250 may mark in its database 750 an indication that RRU 216 is now available or unreserved; now, other mobile server providers are allowed to register and use RRU 216. Server 714 of broker network 250 may also perform an action to indicate an ending of the charging or billing event (step 7.5 of FIG. 9). An action may be or include closing or generating a record having information related to charging or billing, or documenting the service for charging or billing. Alternatively, the action to indicate an ending of the charging or billing event may be or include sending a message to a charging or monitoring function for closing or generating such a record, etc. The information may be or include an identifier or serial number of the RRU/RIU, a bandwidth of a fronthaul link or eCPRI with the RRU/RIU, or Quality of Service or "QoS" of L2 or L3 communications, a timestamp which includes a date and/or time, a predetermined time period, etc. In at least some implementations, the message in step 7 of FIG. 9 may alternatively be communicated to server 716 for vRAN usage billing (see e.g. FIG. 7) directly or through a corresponding message sent from server 714 upon its receipt.

RRU 216 may send to server 714 of broker network 250 a message indicating a notification or confirmation of the deregistration and/or release (step 8 of FIG. 9). Server 714 of broker network 250 may send to DHCP server 716 a message indicating to remove or delete the stored association between IP address associated with DU 212 and the identifier or IP address of RRU 216 (step 9 of FIG. 9). In response, DHCP server 716 may remove or delete the stored association or IP address. In some preferred implementations, RRU 216 that is now available but unreserved is powered down and/or placed in a sleep or low power mode of operation. Again, RRU 216 is now available for other mobile server providers to register and use.

Figure 10:
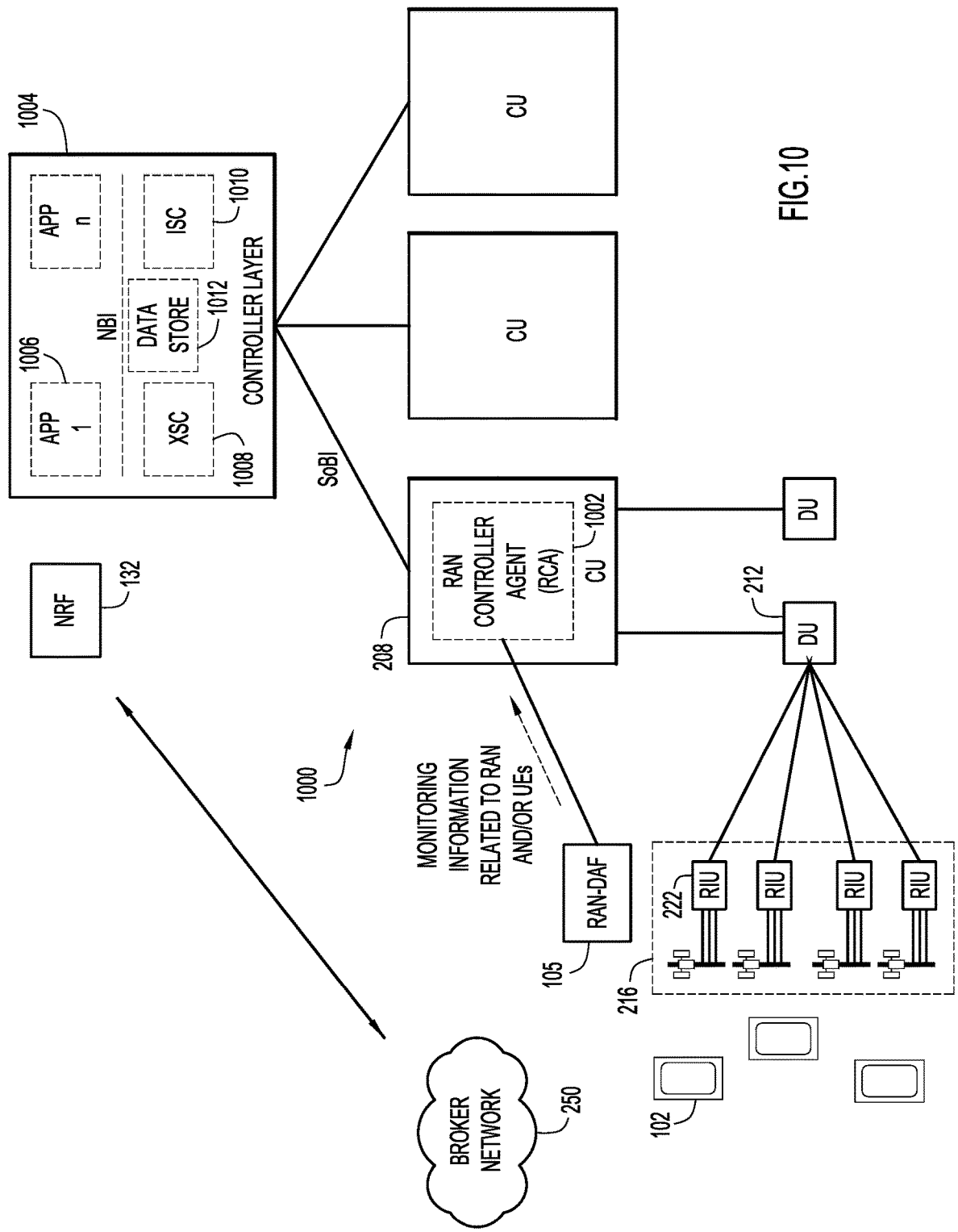
FIG. 10 is an illustrative representation of a network node arrangement of select network nodes or functions including a controller layer and a RAN Controller Agent (RCA) which may be utilized according to some implementations of the present disclosure.

FIG. 10 is an illustrative representation of a network node arrangement 1000 of select network nodes or functions including a controller layer 1004 and a RAN Controller Agent (RCA) 1002 (shown in CU 208), as well as RAN-DAF 105, which may be utilized according to some implementations. In some implementations, such an arrangement may be used for radio resource management and/or congestion management (e.g. increasing or decreasing the number of RRUs/RIUs). Also in some implementations (i.e. additional or alternative implementations, such an arrangement may be used for the communication of configuration information for remote configuration of RRUs/RIUs.

Controller layer 1004 of FIG. 10 provides a mechanism to enable RAN control functions as one or more specific applications for use in some implementations. Controller layer 1004 may communicate with RAN NFs via RCA 1002, which may be provided in the CU 208 (e.g. interfacing distributed and centralized NFs to logically-centralized controllers). Control may be made available to the core through use of AFs as part of the SBA (see e.g. FIG. 1B). As shown, one of more applications (e.g. an App 1006) may run on a North-Bound Interface (NBI) over a cross-Slice Controller (XSC) and an Intra-Slice Controller (ISC), and communication with the RAN may be maintained over a South-Bound Interface (SoBI). The SoBI may be the unifying interface between the RCA 1002 and the controllers for the monitoring and re-configuring of NFs. Control commands and interactions with the gNBs (e.g. CU/DU/RRU) may be provided via the SoBI. RCA 1002 may serve as a middleware between a controller and NFs using a local data store 1012 for storing most recent monitoring information. Such a local data store 1012 may be provided for each XSC 1008 and ISC 1010. Each programmable NF in DU 212 and CU 208 may support interaction with RCA 1002 for exchanging control information with the applications deployed on top of the controllers.

RAN-DAF 105 may be provided in the architecture to enable one or more control functions in the RAN. In some implementations, RAN-DAF 105 may be provided for analytics for improving RAN NFs, e.g. for radio resource management and/or congestion management. Analytics based on processing of measurements may be obtained and maintained locally for optimizing performance. In particular, analytics may collected from measurements and used for changing (e.g. increasing or decreasing) the number of radio resources (e.g. RRUs/RIUs) for optimizing performance. In some implementations, the analytics and measurements may be real-time analytics and/or real-time measurements, and the performance may be optimized dynamically.

The monitored information may include information relating to radio resource conditions and availability (e.g. average channel quality, load, and interference), as well as traffic (e.g. user density) and other factors, whether in real-time or non-real time. In some implementations, RAN-DAF 105 may be configured to collect monitoring information related to both UEs and the RAN, where the monitoring information includes specific parameters such as a Channel Quality Indicator (CQI), a power level, a path loss, a radio link quality, a radio resource usage, a Modulation and Coding Scheme (MCS), a Radio Link Control (RLC) buffer state information, and so on.

In some particular implementations, RAN-DAF 105 may be assigned to an initial number of RRUs for analytics data in a particular geographic location. After an increase in the initial number of RRUs (i.e. using the broker network), RAN-DAF 105 may be assigned to the increased number of RRUs for the same or similar geographic location. The "effect" or difference in analytics data may then be used as a basis to further increase or decrease the number of RRUs. See e.g. initial steps (e.g. step 0) of FIGS. 8A and 9.

In some implementations, RCA 1002 may interface with RAN-DAF 105 which collects monitoring information related to UEs and/or the RAN. The monitoring information may be or include CQI, power level, path loss, radio link quality, radio resource usage, MCS, RLC buffer state information, etc. RCA 1002 may forward the information obtained from RAN-DAF 105 to the controllers and further to northbound applications. Such information may be communicate to NFs such as NRF 132 for identifying any need to change (e.g. increase or decrease) radio resources (RRUs/ RIUs) in the RAN.

As described earlier above, the new NG-RAN architecture addresses, among other things, the challenges of building multi-vendor networks and harmonizing to a common feature set. One fundamental characteristic is the decomposition of the radio signal processing stack based on standardized functional "splits." The radio signal processing stack may be considered a service chain of functions which are processed sequentially. As indicated previously, an identification of the proper functional split (i.e. split option 7 or 8, CPRI vs. eCPRI, etc.) may be desired to provide and/or ensure compatibility between a selected RRU and a vDU.

Figure 11:
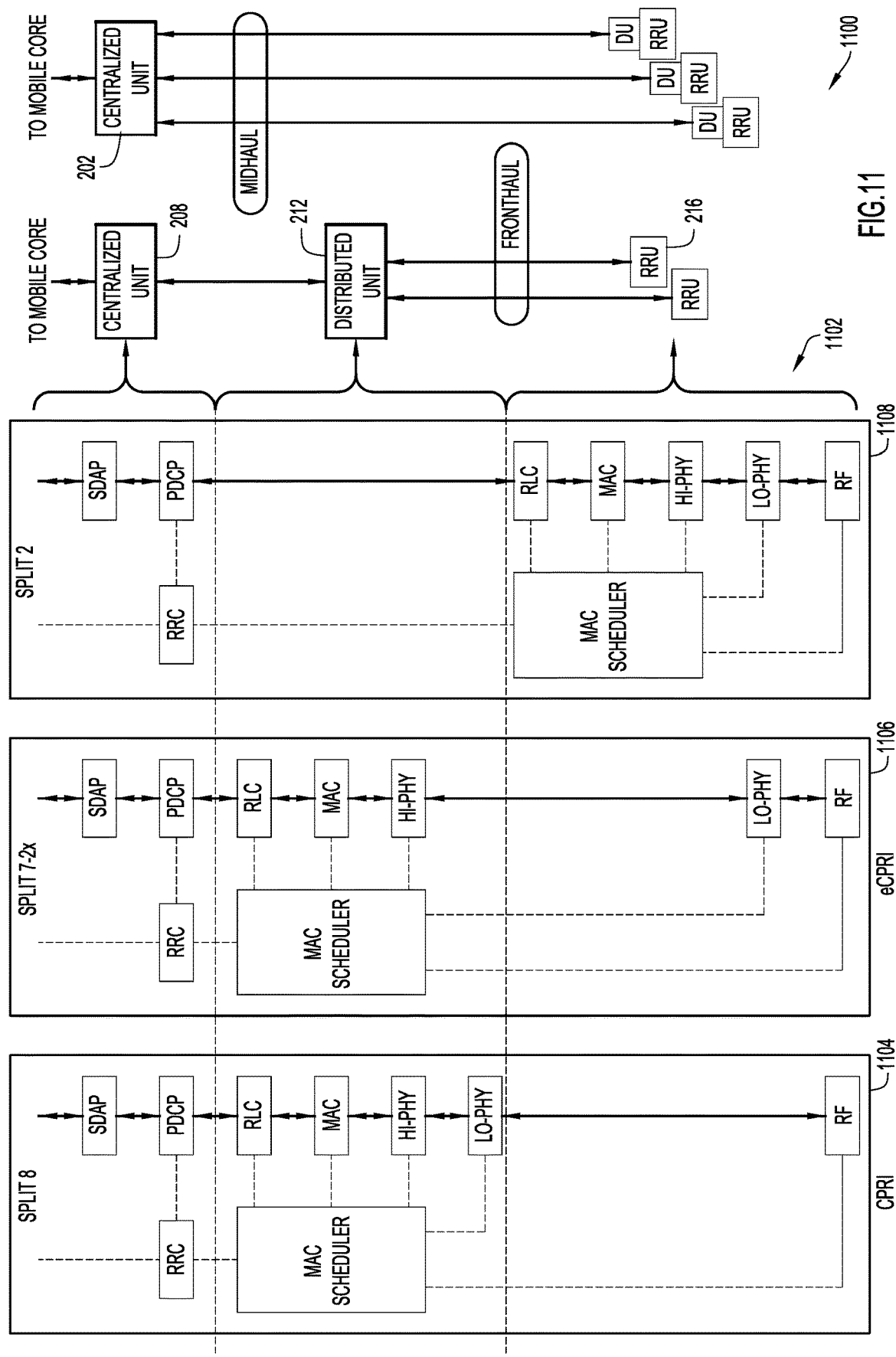
FIG. 11 is a schematic block diagram of a decomposition of a radio signal processing stack based on predetermined splits which may be used in the vRAN environment according to some implementations of the present disclosure.

Referring now to FIG. 11, a schematic block diagram 1100 which illustrates the decomposition of a radio signal processing stack based on a plurality of predetermined functional splits 1102 which may be utilized in the vRAN environment according to some implementations is shown. The processing stack may include several different layers to perform various functions to enable the functions of the RAN. In general implementations, each layer may include any combination of specialized electronic circuitry, specialized programmable circuitry, general purpose processors, other types of circuitry, firmware, and software. The processing stack has a generally hierarchical structure with modules at one level generally communicating to modules directly above and below it, although communication of some information and/or control may bypass one or more levels. In some embodiments, a higher-level module may include a more software-centric implementation while lower-level modules may rely more on application-specific electronic circuitry, although any module may have any combination of hardware and software, depending on the embodiment. This is due to generally stricter timing requirements at lower levels as compared to upper levels, which may necessitate a more hardware-centric solution in some cases. In preferred implementations, CU 208 is completely virtualized as a vCU and DU 212 is completely virtualized as a vDU (e.g. on a common server platform).

In FIG. 11, the processing stack is decomposed according to predetermined functional splits which include a split option 1104 ("Split 8"), a split option 1106 ("Split 7-2" or "split-7"), and a split option 1108 ("Split 2"). As illustrated, functions of CU 208 for split option 1104 ("Split 8") may include a Radio Resource Control (RRC) function, a Service Delivery Application Protocol (SDAP) function, and a Packet Data Convergence Protocol (PDCP) function. Functions of DU 212 for split option 1104 may include a Radio Link Control (RLC) function, a Media Access Control (MAC) function, a high physical (HI-PHY) layer function, and a low physical (LO-PHY) layer function, and further include a MAC scheduler function which interfaces with each of the functions. Functions of RRU 216 for split option 1104 include a radio frequency (RF) layer function.

Functions of CU 208 for split option 1106 ("Split 7-2x" or "Split 7") may include the RRC function, the SDAP function, and the PDCP function. Functions of DU 212 for split option 1106 may include the RLC function, the MAC function, and the HI-PHY function, but exclude the LO-PHY layer function. Functions of RRU 216 for split option 1106 include the LO-PHY layer function and the RF layer function.

Functions of CU 208 for split option 1108 ("Split 2") may include the RRC function, the SDAP function, and the PDCP function. Functions of RRU 216 (or DU/RRU) for split option 1108 may include the RLC function, the MAC function, the HI-PHY function, the LO-PHY layer function, and the RF layer function. For split option 1108 ("Split 2"), there is no separated distributed unit.

In CU 208, the SDAP, the PDCP, and the RRC functions may involve packet-level manipulations (e.g. header compression, over-the-air ciphering) that are time-insensitive and easily implemented in a virtualized environment. The CU 208 may be provided at a location that is suitable for deploying a UPF in decomposed packet core architectures (i.e. decomposed CP/UP architectures, such as a Control and User Plane Separation or "CUPS" architecture). The midhaul link may connect CU 208 to DU 212. In DU 212, the RLC, the MAC, and the PHY layer functions may provide for a significant preparation for the RF layer function (e.g. rate adaptation, channel coding, modulation, and scheduling). For the MAC layer, the functions of DU 212 are time-sensitive, as a transport block of duration of a Transmit Time Interval (e.g. 1 millisecond in LTE) is produced for consumption by the PHY layer.

The fronthaul link from DU 212 may transport digitized RF samples in either the time domain or the frequency domain. The fronthaul interface between CU 208 and DU 212 may be implemented based on interface standards such as CPRI ("Split 8") or eCPRI ("Split 7-2x" or "Split 7"). Again, CPRI is a standard for transporting baseband I/Q signals to the radio unit of a traditional BTS; eCPRI provides for radio data transmission via a packet-based fronthaul transport network, such as IP or Ethernet.

In the RF layer function, there may be any number of RF layer functional blocks which may be respectively coupled to any number of antennas. The RF layer function may include functions such as RF transmission and/or reception and tuning, RF amplification and/or gain control, frequency up-conversion, frequency down-conversion, filtering, analog-to-digital conversion and digital-to-analog conversion. The RF layer function may communicate with the LO-PHY function to exchange data and/or control information. In some embodiments, the communication uses digital baseband samples, which may be represented by a single value or by a pair of I/Q values.

The LO-PHY function may include functionality defined by a first-layer protocol, such as a physical-layer protocol, of a RAN. The exact split between the LO-PHY function and the HI-PHY function may vary between architectures and implementations. In some implementations, the LO-PHY function may receive frequency-domain information generated by the HI-PHY function and convert the frequency-domain information into the time-domain baseband samples for the RF layer function. The LO-PHY function may include circuitry for Fourier transforms to convert frequency-domain information into time-domain information, and/or circuitry for inverse Fourier transforms to convert time-domain information into frequency-domain information. The Fourier-based functions may utilize any appropriate algorithm including, but not limited to a discrete Fourier Transform (DFT), a FFT, an inverse discrete Fourier Transform (IDFT), an inverse fast Fourier transform (IFFT), or any other type of Fourier-based algorithm that may appropriately be used.

The HI-PHY function may include those functions defined by the first-layer protocol of the RAN (e.g. the physical layer) that are excluded from the LO-PHY function. The list of functions included may vary according to the RAN protocol and the implementation, but may include functionality such as muxing, demuxing, modulation, demodulation, encoding, and/or decoding.

Again, communication between the RF layer function and the LO-PHY function for "Split 8" may use an interconnect such as CPRI. Communication between the LO-PHY function and the HI-PHY function for "Split 7-2x" or "Split 7" may use an interconnect such as eCPRI which provides for radio data transmission via a packet-based fronthaul transport network, such as IP or Ethernet. Other suitable interfaces may be utilized.

Figure 12:
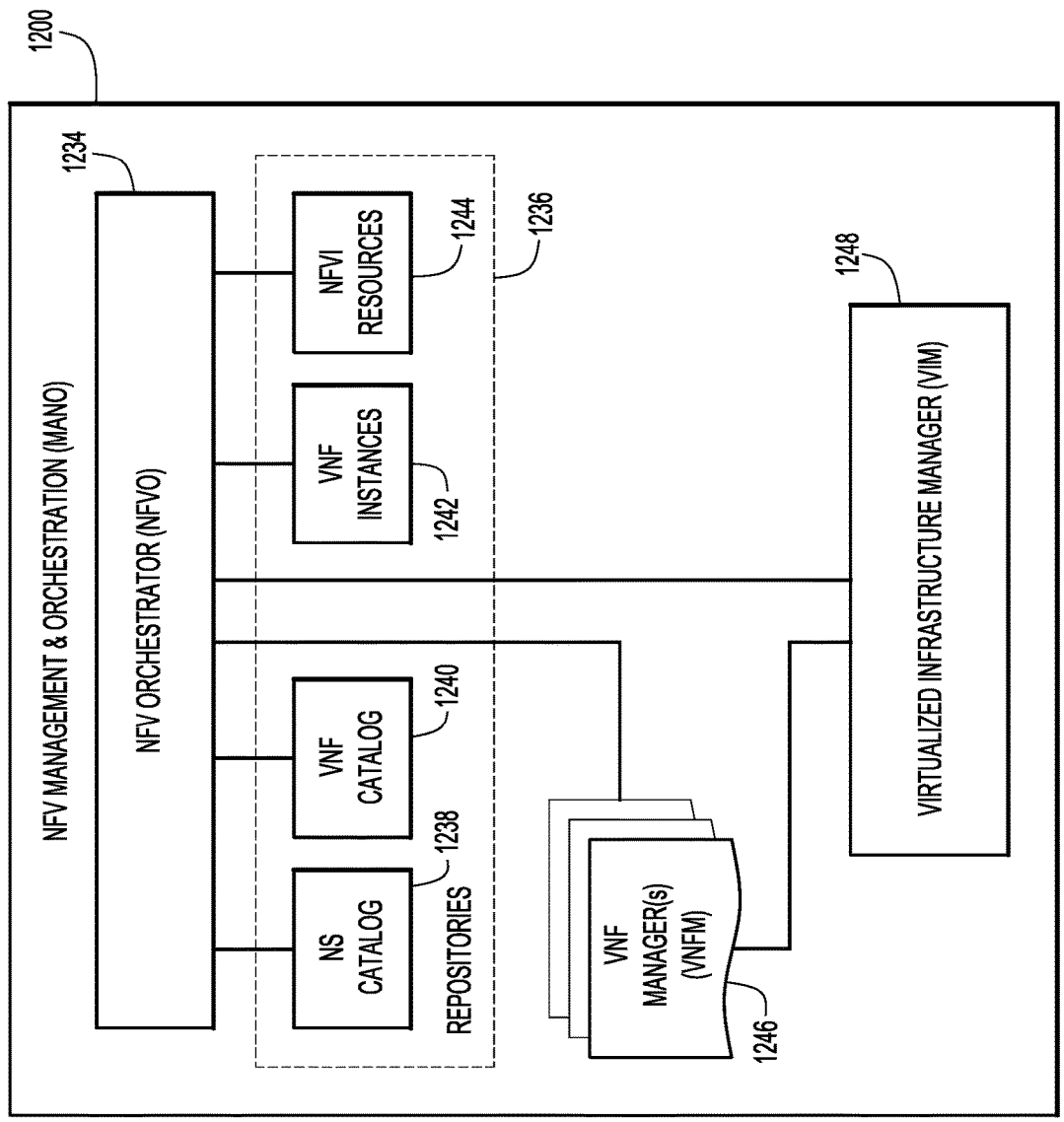
FIG. 12 is an illustrative representation of a network function virtualization (NFV) management and orchestration (MANO) which may be used in at least some implementations of the present disclosure.

FIG. 12 is an illustrative representation of a NFV management and orchestration (MANO) 1200 which may be used in at least some implementations of the present disclosure. MANO 1200 is generally configured for the management or orchestration of the instantiation, modification, and tear-down of virtualized functions. The virtualized functions may include vCUs and vDUs which interface with selected RRUs according to some implementations. MANO 1200 may include a NFV Orchestrator (NFVO) 1234 which may interface with a Virtualized Infrastructure Manager (VIM) 1248 and one or more VNF Managers (VNFM) 1246. NFVO 1234 may also interface with a number of different resources or the like, such as a Network Service (NS) catalog 1238, a VNF Catalog 1240, a VNF Instances repository 1242, and a Network Functions Virtualization Infrastructure (NFVI) resources repository 1244. MANO 1200 may generally provide interfaces to existing systems, such as an OSS/Business Support System (BSS), if and as needed. NS Catalog 1238 may include templates that can be used as the basis for supporting network services. VNF catalog 1240 may contain templates for the instantiation of different classes of VNFs. A particular VNF, after being instantiated, may be referred to as a VNF instance, and its attributes may be stored in VNF instances repository 1242. NFVI resources 1244 may be used to track the availability of resources, including both virtual resources and the physical infrastructure upon which they are instantiated.

Figure 13:
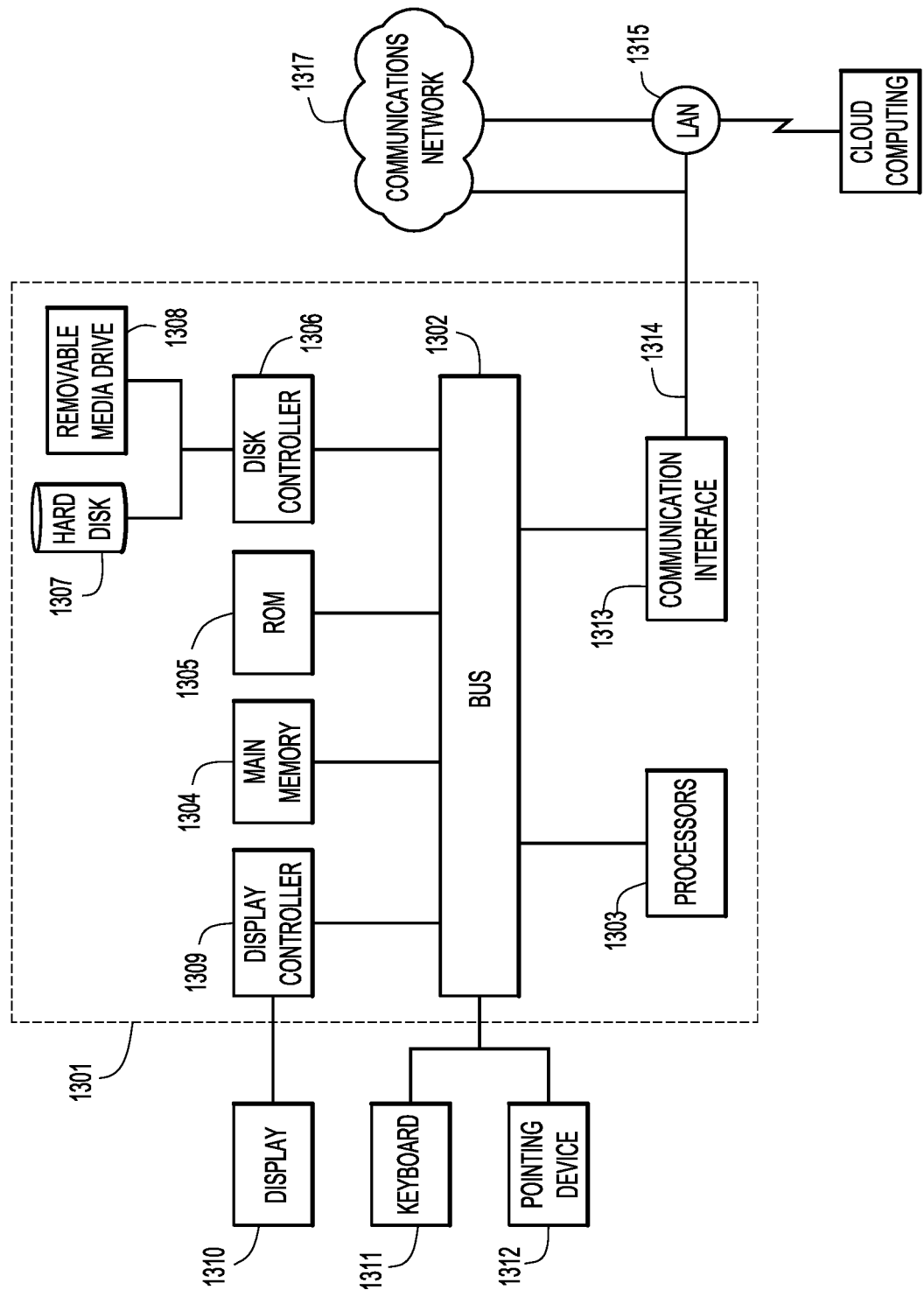
FIG. 13 is a block diagram of a network node, such as a server (e.g. a server of a broker network), according to some implementations of the present disclosure.

FIG. 13 is a block diagram of a network node, such as a server, according to some implementations of the present disclosure. Such a network node or server may be provided for use in a broker network according to some implementations (e.g. as server 714 of broker network 250 of FIG. 7). In some implementations, the network node or server may comprise a computer system 1301 which may include one or more processors 1303 coupled to a bus 1302 or other information communication mechanism. The one or more processors 1303 may be configured to process information which may be communicated over bus 1302. While FIG. 13 shows a single block for processor 1303, processors 1303 may in actual practice represent a plurality of processing cores, each of which may perform separate processing.

Computer system 1301 may also include a main memory 1304, such as a random access memory (RAM) or other dynamic storage device (e.g. dynamic RAM (DRAM), static RAM (SRAM), and synchronous DRAM (SD RAM)), coupled to the bus 1302 for storing information and instructions to be executed by processor 1303. The main memory 1304 may be used for storing temporary variables or other intermediate information during the execution of instructions by the processor 1303. Computer system 1301 may further include a read only memory (ROM) 1305 or other static storage device (e.g. programmable ROM (PROM), erasable PROM (EPROM), and electrically erasable PROM (EEPROM)) coupled to the bus 1302 for storing static information and instructions for the processor 1303.

Computer system 1301 may also include a disk controller 1306 coupled to the bus 1302 to control one or more storage devices for storing information and instructions, such as a magnetic hard disk 1307, and a removable media drive 1308 (e.g. floppy disk drive, read-only compact disc drive, read/write compact disc drive, compact disc jukebox, tape drive, and removable magneto-optical drive). The storage devices may be added to the computer system 1301 using an appropriate device interface (e.g. small computer system interface (SCSI), integrated device electronics (IDE), enhanced-IDE (E-IDE), direct memory access (DMA), or ultra-DMA).

Computer system 1301 may also include special purpose logic devices (e.g. application specific integrated circuits (ASICs)) or configurable logic devices (e.g. simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Computer system 1301 may also include a display controller 1309 coupled to the bus 1302 to control a display 1310, such as a cathode ray tube (CRT), for displaying information to a computer user. Computer system 1301 includes input devices, such as a keyboard 1311 and a pointing device 1312, for interacting with a computer user and providing information to the processor 1303. The pointing device 1312, for example, may be a mouse, a trackball, or a pointing stick for communicating direction information and command selections to the processor 1303 and for controlling cursor movement on the display 1310.

Computer system 1301 performs a portion or all of the processing steps of the process in response to the processor 1303 executing one or more sequences of one or more instructions contained in a memory, such as the main memory 1304. Such instructions may be read into the main memory 1304 from another computer readable medium, such as a hard disk 1307 or a removable media drive 1308. One or more processors in a multi-processing arrangement may also be employed to execute the sequences of instructions contained in main memory 1304. In alternative embodiments, hard-wired circuitry may be used in place of or in combination with software instructions. Thus, embodiments are not limited to any specific combination of hardware circuitry and software.

As stated above, computer system 1301 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g. CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1301, for driving a device or devices for implementing the process, and for enabling the computer system 1301 to interact with a human user (e.g. print production personnel). Such software may include, but is not limited to, device drivers, operating systems, development tools, and applications software. Such computer readable storage media may further include a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Computer system 1301 also includes a communication interface 1313 coupled to the bus 1302. The communication interface 1313 provides a two-way data communication coupling to a network link 1314 that is connected to, for example, a local area network (LAN) 1315, or to another communications network 1317 such as the Internet. For example, the communication interface 1313 may be a wired or wireless network interface card to attach to any packet switched (wired or wireless) LAN. As another example, the communication interface 1313 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1313 sends and receives electrical, electromagnetic or optical signals that carry digital data streams representing various types of information.

The network link 1314 typically provides data communication through one or more networks to other data devices. For example, the network link 1314 may provide a connection to another computer through a local area network 1315 (e.g. a LAN) or through equipment operated by a service provider, which provides communication services through a communications network 1317. The local area network 1315 and the communications network 1317 use, for example, electrical, electromagnetic, or optical signals that carry digital data streams, and the associated physical layer (e.g. CAT 5 cable, coaxial cable, optical fiber, etc.). The signals through the various networks and the signals on the network link 1314 and through the communication interface 1313, which carry the digital data to and from the computer system 1301 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1301 can transmit and receive data, including program code, through the network(s) 1315, the network link 1314 and the communication interface 1313. Moreover, the network link 1314 may provide a connection through a LAN 1315 to a cloud computing network.

Figure 14:
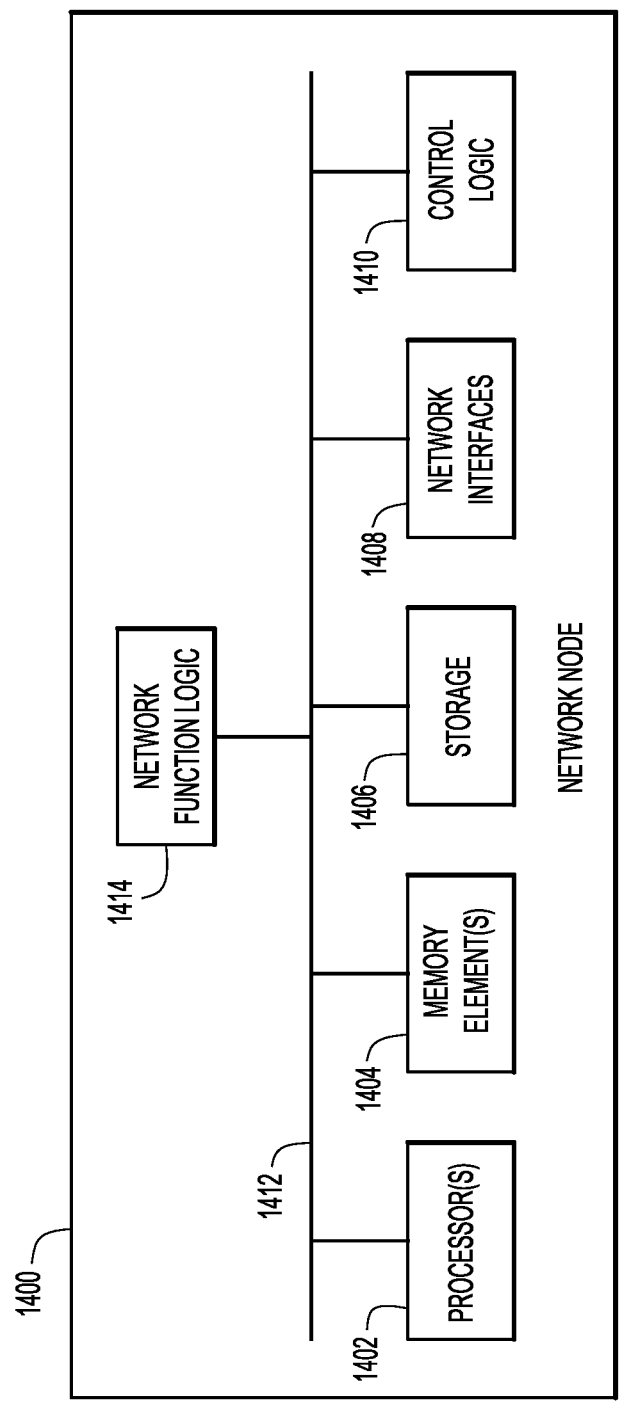
FIG. 14 illustrates a block diagram of a network node for a network function (NF) of a 5G network configured to perform operations according to some implementations.

FIG. 14 is a simplified block diagram illustrating example details that can be associated with a network node 1400 (network equipment, a compute or computing node) for an NF, such as which may be associated with an NRF, in accordance with some implementations (in the context of the 5G network of FIGS. 1B-1C) and associated techniques and mechanism described herein. In various embodiments, network element functionality may be performed using any combination of network nodes. In various embodiments, network node 1400 can be implemented as, for example, a data center network node such as a server, rack of servers, multiple racks of servers, etc., for a data center; or a cloud network node, which may be distributed across one or more data centers.

In some implementations, network node 1400 can include can include one or more processors 1402, one or more memory elements 1404, storage 1406, network interfaces 1408, control logic 1410 and network function logic 1414. In some implementations, the processors 1402 are at least one hardware processor configured to execute various tasks, operations and/or functions for network node 1400 as described herein according to software and/or instructions configured for the network node 1400. In some implementations, memory elements 1404 and/or storage 1406 are configured to store data, information, software, instructions, logic (e.g. any logic 1410 and/or 1414), data structures, combinations thereof, or the like for various embodiments described herein. Note that in some implementations, storage can be consolidated with memory elements (or vice versa), or can overlap/exist in any other suitable manner.

In some implementations, network interfaces 1408 enable communication between for network node 1400 and other network elements, systems, slices, etc. that may be present in the system to facilitate operations as discussed for various embodiments described herein. In some implementations, network interfaces 1408 can include one or more Ethernet drivers and/or controllers, Fibre Channel drivers, and/or controllers, or other similar network interface drivers and/or controllers to enable communications for network node 1400 within the system.

In some implementations, control logic 1410 can include instructions that, when executed (e.g. via processors 1402), cause for network node 1400 to perform operations, which can include, but not be limited to, providing overall control operations of network node 1400; cooperating with other logic, data structures, etc. provisioned for and/or maintained by network node 1400; combinations thereof; or the like to facilitate various operations as discussed for various embodiments described herein.

In some implementations, bus 1412 can be configured as an interface that enables one or more elements of network node 1400 (e.g. processors 1402, memory elements 1404, logic, etc.) to communicate in order to exchange information and/or data. In at least one embodiment, bus 1412 may be implemented as a fast kernel-hosted interconnect, potentially using shared memory between processes (e.g. logic, etc.), which can enable efficient communication paths between the processes.

In some implementations, network function logic 1414 can include instructions that, when executed (e.g. via one or more processors 1402) cause network node 1400 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a system or network may represent a series of points or nodes of interconnected communication paths (wired or wireless) for receiving and transmitting packets of information that propagate through the network. In some implementations, a network may be associated with and/or provided by a single network operator or service provider and/or multiple network operators or service providers. In various embodiments, the network may include and/or overlap with, in whole or in part, one or more packet data network(s) (e.g. one or more packet data networks). A network may offer communicative interfaces between various elements and may be further associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, Low Power Wide Area Network (LPWAN), Low Power Network (LPN), Machine to Machine (M2M) network, IoT Network, or any other appropriate architecture or system that facilitates communications in a network environment.

Note that the terms 'UE', 'mobile device,' 'mobile radio device,' 'end device', 'user', 'subscriber' or variations thereof may be used interchangeably and are inclusive of devices used to communicate, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first radio provider could be termed a second radio provider, and similarly, a second radio provider could be termed a first radio provider, without changing the meaning of the description, so long as all occurrences of the "first radio provider" are renamed consistently and all occurrences of the "second radio provider" are renamed consistently. The first radio provider and the second radio provider are both radio providers, but they are not the same radio provider.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at one or more network nodes of a broker network,
        receiving one or more messages indicating a request for identification of remote radio units (RRU s) of at least one radio provider, and further indicating a plurality of requirements of the RRUs;
        selecting, from a database, a plurality of identifiers which identify a plurality of RRUs of the at least one radio provider, each RRU of the plurality of RRUs having a plurality of capabilities corresponding to the plurality of requirements of the RRUs; and
        sending a message which triggers a remote configuration of parameters in the at least one of the plurality of RRUs for operation in a virtualized radio access network (vRAN) used by a mobile network.

2. The method of claim 1, further comprising:
    sending, to the at least one of the plurality of RRUs, an address of a virtualized distributed unit (vDU) of the vRAN for the remote configuration of parameters.

3. The method of claim 1, further comprising:
    assigning an IP address to the at least one of the plurality of RRUs for communication in the mobile network.

4. The method of claim 1, wherein the plurality of identifiers which identify the plurality of RRUs comprise identifiers of RRUs of a plurality of different radio providers.

5. The method of claim 1, wherein:
    the plurality of capabilities include one or more of the following: a radio frequency (RF) band, a bandwidth, a sampling rate, a buffer memory size, a hardware capability, a hardware version number, and a software version number, and
    the parameters include one or more of the following: a center frequency, a bandwidth, a sampling frequency, an available filter, a Fast Fourier Transform (FFT) size, a cyclic prefix (CP) length, an antenna mapping, an automatic gain control (AGC) parameter, and a transmission constellation.

6. The method of claim 1, wherein the plurality of capabilities include an identification of a type of a fronthaul interface of each RRU or an identification of a functional split of each RRU.

7. The method of claim 1, further comprising:
    sending a Wake-on-LAN message to the at least one of the plurality of RRUs.

8. The method of claim 1, further comprising:
    upon notification that the at least one of the plurality of RRUs are in service with the mobile network,
        creating a record having information related to charging or billing associated with the at least one of the plurality of RRUs; or
        sending a message to a charging or monitoring function for creating a record for charging or billing associated with the at least one of the plurality of RRUs.

9. A server of a broker network, the server comprising:
    a network interface;
    one or more processors;
    memory for storing instructions;
    the one or more processors configured to execute the instructions for:
        receiving one or more messages indicating a request for identification of remote radio units (RRUs) of at least one radio provider, and further indicating a plurality of requirements of the RRUs;
        selecting, from a database, a plurality of identifiers which identify a plurality of RRUs of the at least one radio provider, each RRU of the plurality of RRUs having a plurality of capabilities corresponding to the plurality of requirements of the RRUs; and
        sending a message which triggers a remote configuration of parameters in the at least one of the plurality of RRUs for operation in a virtualized radio access network (vRAN) used by a mobile network.

10. The server of claim 9, wherein the one or more processors are configured to execute the instructions further for:
    sending, to the at least one of the plurality of RRUs, an address of a virtualized distributed unit (vDU) of the vRAN for the remote configuration of parameters and operation in the vRAN used by the mobile network.

11. The server of claim 9, wherein the plurality of identifiers which identify the plurality of RRUs comprise identifiers of RRUs of a plurality of different radio providers.

12. The server of claim 9, wherein:
    the plurality of capabilities include one or more of the following: a radio frequency (RF) band, a bandwidth, a sampling rate, a buffer memory size, a hardware capability, a hardware version number, and a software version number; and
    the parameters include one or more of the following: a center frequency, a bandwidth, a sampling frequency, an available filter, a Fast Fourier Transform (FFT) size, a cyclic prefix (CP) length, an antenna mapping, an automatic gain control (AGC) parameter, and a transmission constellation.

13. The server of claim 9, wherein the one or more processors are configured to execute the instructions further for:
    sending a Wake-on-LAN message to the at least one of the plurality of RRUs.

14. A method comprising:
sending to a broker network one or more messages indicating a request for identification of remote radio units (RRUs) of at least one radio provider, and further indicating a plurality of requirements of the RRUs;
receiving from the broker network one or more messages which include a plurality of identifiers which identify a plurality of RRUs of the at least one radio provider, each RRU of the plurality of RRUs having a plurality of capabilities corresponding to the plurality of requirements of the RRUs; and
sending to the broker network one or more messages indicating a selection of at least one of the plurality of RRUs, for triggering a remote configuration of parameters in the at least one of the plurality of RRUs for operation in a virtualized radio access network (vRAN) of a mobile network.

15. The method of claim 14, wherein sending to the broker network the one or more messages indicating the selection of the at least one of the plurality of RRUs further comprises:
sending to the broker network the one or more messages indicating the selection of the one or more of the RRUs, for causing the at least one of the plurality of RRUs to connect with a virtualized distributed unit (vDU) of the vRAN for the remote configuration of parameters.

16. The method of claim 14, wherein sending to the broker network the one or more messages indicating the selection of the at least one of the plurality of RRUs further comprises:
sending to the broker network the one or more messages indicating the selection of the one or more of the RRUs, for causing the at least one of the plurality of RRUs to register in the mobile network for operation.

17. The method of claim 14, wherein:
the plurality of capabilities include one or more of the following: a radio frequency (RF) band, a bandwidth, a sampling rate, a buffer memory size, a hardware capability, a hardware version number, and a software version number; and
the parameters include one or more of the following: a center frequency, a bandwidth, a sampling frequency, an available filter, a Fast Fourier Transform (FFT) size, a cyclic prefix (CP) length, an antenna mapping, an automatic gain control (AGC) parameter, and a transmission constellation.

18. The method of claim 14, further comprising:
identifying a need to add or change radio resources of the mobile network based on monitoring information obtained from a data analytics function of the mobile network.

19. The method of claim 14, further comprising:
storing, by a network function (NF) repository function (NRF) of the mobile network, profile information associated with the at least one of the plurality of RRUs.

20. The method of claim 14, which is performed by a network node or function of the mobile network.

* * * * *